(12) United States Patent
Bae et al.

(10) Patent No.: US 10,509,943 B2
(45) Date of Patent: Dec. 17, 2019

(54) METHOD OF PROCESSING FINGERPRINT INFORMATION

(71) Applicant: SAMSUNG ELECTRONICS CO., LTD., Suwon-si (KR)

(72) Inventors: Geun Tae Bae, Seoul (KR); Sung Hoon Son, Suwon-si (KR); Woong Hee Lee, Seoul (KR); Ho Jae Lee, Suwon-si (KR); Do Ha Hwang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 185 days.

(21) Appl. No.: 15/717,067

(22) Filed: Sep. 27, 2017

(65) Prior Publication Data
US 2018/0211093 A1   Jul. 26, 2018

(30) Foreign Application Priority Data

Jan. 20, 2017   (KR) .................. 10-2017-0010058

(51) Int. Cl.
*G06K 9/00*   (2006.01)
*G06K 9/62*   (2006.01)
(Continued)

(52) U.S. Cl.
CPC ..... *G06K 9/00087* (2013.01); *G06F 16/5838* (2019.01); *G06F 21/32* (2013.01);
(Continued)

(58) Field of Classification Search
CPC ........... G06K 9/00087; G06K 9/00026; G06K 9/00067; G06K 9/001; G06K 9/00926;
(Continued)

(56) References Cited

U.S. PATENT DOCUMENTS 7,127,106 B1 * 10/2006 Neil ..................... G06K 9/4609
382/181
7,457,442 B2 * 11/2008 Mimura ............. G06K 9/00087
382/124
(Continued)

FOREIGN PATENT DOCUMENTS

KR      10-0489430 B1   5/2005
KR   10-2011-0022923 A   3/2011
(Continued)

OTHER PUBLICATIONS

Yau, Wei-Yun, Kar-Ann Toh, and Tai-Pang Chen. "Fingerprint templates combination." Chinese Conference on Biometric Recognition. Springer, Berlin, Heidelberg, 2004. (Year: 2004).*

*Primary Examiner* — Jonathan S Lee
(74) *Attorney, Agent, or Firm* — Sughrue Mion, PLLC

(57) ABSTRACT

A method for processing fingerprint information includes dividing an input image that corresponds to at least a portion of a user fingerprint into a plurality of first regions; dividing a registered image that had previously been stored into a plurality of second regions; selecting a first matching region from among the plurality of first regions, and selecting a second matching region from among the plurality of second regions, by comparing the plurality of first regions with the plurality of second regions; and matching the registered image with the input image by comparing the first matching region with the second matching region.

15 Claims, 22 Drawing Sheets

(51) Int. Cl.
*G06F 21/32* (2013.01)
*G06F 16/583* (2019.01)
*G06K 9/52* (2006.01)

(52) U.S. Cl.
CPC ......... *G06K 9/001* (2013.01); *G06K 9/00026* (2013.01); *G06K 9/00067* (2013.01); *G06K 9/00926* (2013.01); *G06K 9/522* (2013.01); *G06K 9/6203* (2013.01); *G06K 9/6215* (2013.01)

(58) Field of Classification Search
CPC .... G06K 9/522; G06K 9/6203; G06K 9/6215; G06F 16/5838; G06F 21/32
USPC ......................................................... 382/125
See application file for complete search history.

(56) References Cited

U.S. PATENT DOCUMENTS

| | | |
|---|---|---|
| 7,778,467 B2 | 8/2010 | Iizuka |
| 7,853,098 B2 | 12/2010 | Hardy et al. |
| 8,155,452 B2 | 4/2012 | Minear |
| 2007/0047785 A1 | 3/2007 | Jang et al. |
| 2008/0019611 A1* | 1/2008 | Larkin ................. G06K 9/6203 382/287 |
| 2008/0279416 A1* | 11/2008 | Lo ....................... G06K 9/00087 382/100 |
| 2008/0298646 A1 | 12/2008 | Wennergren |
| 2010/0232659 A1 | 9/2010 | Rahmes et al. |
| 2011/0044513 A1 | 2/2011 | McGonagle et al. |
| 2014/0233812 A1 | 8/2014 | Rosqvist |
| 2016/0117545 A1 | 4/2016 | Chiang et al. |
| 2016/0132710 A1 | 5/2016 | Setterberg et al. |
| 2016/0132711 A1 | 5/2016 | Setterberg et al. |
| 2016/0147825 A1 | 5/2016 | Chiang et al. |
| 2016/0203354 A1 | 7/2016 | Choi et al. |
| 2016/0217310 A1 | 7/2016 | Shah et al. |
| 2016/0314338 A1 | 10/2016 | Li et al. |
| 2017/0004346 A1* | 1/2017 | Kim ..................... G06F 16/5866 |
| 2017/0075700 A1* | 3/2017 | Abudi .................. G06F 9/4418 |
| 2017/0220846 A1* | 8/2017 | Du ....................... G06K 9/00026 |

FOREIGN PATENT DOCUMENTS

| | | |
|---|---|---|
| KR | 10-2011-0114191 A | 10/2011 |
| KR | 10-2016-0106686 A | 9/2016 |
| WO | 2016/072920 A1 | 5/2016 |

* cited by examiner

METHOD OF PROCESSING FINGERPRINT INFORMATION

CROSS-REFERENCE TO RELATED APPLICATION(S)

This application claims priority from Korean Patent Application No. 10-2017-0010058 filed on Jan. 20, 2017 in the Korean Intellectual Property Office, the disclosure of which is incorporated herein by reference in its entirety.

BACKGROUND

1. Field

Example embodiments relate to a method of processing fingerprint information.

2. Description Of Related Art

As utilization of various types of information technology (IT) devices, including mobile devices, is gradually expanding, various technologies for enhancing the security of IT devices have been proposed. In addition to existing password and pattern inputs, security technology based on using the personal biometric information of individuals has been applied to various IT devices. Among security technologies that use biometric information, fingerprint sensing technology has various positive properties in terms of manageability, security, economy, and the like. Thus, the application thereof has gradually increased.

SUMMARY

One or more example embodiments is to provide a method for processing fingerprint information, in which fingerprint recognition performance may be improved.

According to an aspect of an example embodiment, there is provided a method of authenticating a user based on fingerprint recognition, including: receiving, by a fingerprint sensor, a fingerprint of the user; dividing, by a processor, an input image that corresponds to at least a portion of the fingerprint of the user into a plurality of first regions; dividing, by the processor, a registered image that has previously been stored into a plurality of second regions; selecting, by the processor, a first matching region from among the plurality of first regions and selecting a second matching region from among the plurality of second regions, based on a comparison between the plurality of first regions and the plurality of second regions; matching, by the processor, the registered image with the input image by comparing the first matching region with the second matching region; and authenticating the user based on a result of the matching.

The method may further include determining, by the processor, a plurality of matching probabilities that correspond to similarities between each of the plurality of first regions and each of the plurality of second regions; and determining, by the processor, the first matching region and the second matching region based on a highest matching probability from among the plurality of matching probabilities.

The determining the plurality of matching probabilities may include determining the plurality of matching probabilities by determining phase correlations between each of the plurality of first regions and each of the plurality of second regions.

A peak value of each of the phase correlations may be determined as the plurality of matching probabilities.

A peak value of each of the phase correlations may be detected to generate correction values for performing a rotation transform of the registered image.

The matching the registered image with the input image may include rotating the registered image, based on a first correction value generated by comparing the first matching region with the second matching region; and matching the registered image with the input image by moving the registered image that has been rotated based on a second correction value, wherein the second correction value is generated by comparing the input image with the registered image that has been rotated.

The second correction value may be generated by comparing the first matching region with the second matching region after the registered image has been rotated based on the first correction value.

The first correction value may be generated by determining a rotation angle for the second matching region with respect to the first matching region by comparing a first frequency component of the first matching region with a second frequency component of the second matching region.

The method may further include determining, by the processor, a matching score that indicates a similarity between the registered image and the input image, in an overlap region formed by the matching the registered image with the input image; determining, by the processor, an area of the overlap region; and determining, by the processor, whether the fingerprint is authenticated, based on at least one from among the matching score and the area of the overlap region.

The determining the matching score may include determining a normalized cross-correlation between the registered image and the input image in the overlap region.

The determining the normalized cross-correlation may include dividing the overlap region into a plurality of sub-regions; searching minutiae in the overlap region; and determining the normalized cross-correlation by assigning a predetermined weight to each of a first sub-region that includes the minutiae and a second sub-region adjacent to the first sub-region.

The registered image may include a plurality of registered component images, and the dividing the registered image may include dividing each of the plurality of registered component images into a plurality of regions.

The method may further include determining, by the processor, a plurality of matching probabilities of the plurality of registered component images with respect to the input image by comparing the plurality of first regions with the plurality of second regions; and selecting, by the processor, the first matching region and the second matching region by comparing each of the plurality of registered component images with the input image in a sequential order for which the plurality of matching probabilities are decreasing.

The method may further include comparing, by the processor, the plurality of matching probabilities of the plurality of registered component images with a predetermined threshold value; selecting, by the processor, registered component images having a matching probability that is greater than the predetermined threshold value as candidate registered images, and determining, by the processor, whether the fingerprint is authenticated by matching each of the candidate registered images with the input image in the sequential order for which the plurality of matching probabilities are decreasing.

According to an aspect of another example embodiment, there is provided a method of authenticating a user based on fingerprint recognition, including: receiving, by a fingerprint sensor, a fingerprint of the user; dividing, by a processor, each of an input image that corresponds to at least a portion of the fingerprint of the user and a registered image that has previously been stored into a plurality of sub-regions; finding, by the processor, from among the plurality of sub-regions of each of the registered image and the input image, a first sub-region that is included in an overlap region in which the registered image overlaps the input image and a second sub-region that is included in the overlap region and is adjacent to the first sub-region, each of the first sub-region and the second sub-region including minutiae; and determining, by the processor, whether the user is authenticated, by assigning a first predetermined weight to the first sub-region and a second predetermined weight to the second sub-region.

The first predetermined weight assigned to the first sub-region may be greater than the second predetermined weight assigned to the second sub-region.

The determining whether the fingerprint is authenticated may include determining a matching score that indicates a similarity between the registered image and the input image in the overlap region by assigning the first predetermined weight to the first sub-region and the second predetermined weight to the second sub-region; determining an area of the overlap region, and determining whether the fingerprint is authenticated based on at least one from among the matching score and the area of the overlap region.

The matching score may be determined by assigning each of the first predetermined weight and the second predetermined weight when a normalized cross-correlation between the registered image and the input image is computed.

The registered image may include information that relates to minutiae included in an original fingerprint image that has previously been input.

The method may further include dividing, by the processor, the input image into a plurality of first regions and dividing the registered image into a plurality of second regions; and matching, by the processor, the input image with the registered image to form the overlap region, by comparing the plurality of first regions with the plurality of second regions.

The matching may include determining a plurality of matching probabilities that correspond to similarities between each of the plurality of first regions and each of the plurality of second regions; selecting, based on a highest matching probability from among the plurality of matching probabilities, a first matching region from among the plurality of first regions and a second matching region from among the plurality of second regions; generating a first correction value to be used for performing a rotation transform of the registered image by detecting a peak value of a phase correlation between the first matching region and the second matching region; rotating the registered image, based on the first correction value; generating a second correction value to be used for performing a translation transform of the registered image after the registered image has been rotated, by comparing the registered image that has been rotated with the input image; moving the registered image that has been rotated, based on the second correction value; and matching the input image with the registered image that has been moved.

Each of the plurality of first regions and each of the plurality of second regions may have an area that is greater than respective areas of the first sub-region and the second sub-region.

According to an aspect of another example embodiment, there is provided a method of authenticating a user based on fingerprint recognition, including: receiving, by a fingerprint sensor, a fingerprint of the user; receiving, by a processor, a request for adding a partial fingerprint image that corresponds to at least a portion of the fingerprint of the user; determining, by the processor, whether to match the partial fingerprint image with a template that has previously been stored, by comparing the partial fingerprint image with the template; and updating, by the processor, the template by adding the partial fingerprint image to the template, when the partial fingerprint image is matched with the template.

The template may include a plurality of component templates, and each of the plurality of component templates may include at least one registered image that corresponds to a fingerprint.

The method may further include determining, by the processor, whether a first component template that includes a first registered image matched with the partial fingerprint image is present by comparing the partial fingerprint image with the at least one registered image included in each of the plurality of component templates; adding, by the processor, the partial fingerprint image to the first component template as a second registered image when the first component template is determined as being present; and determining, by the processor, whether the first component template is able to be merged with at least one additional component template by comparing the first component template with remaining component templates from among the plurality of component templates.

The method may further include merging, by the processor, the first component template with the at least one additional component template when the first component template is determined as being able to be merged with the at least one additional component template.

The method may further include arranging, by the processor, the plurality of component templates based on at least one from among a number of authentication successes, a number of registered images included in each of the plurality of component templates, and an area of an overlap region formed by overlapping respective registered images included in each of the plurality of component templates with each other.

When the partial fingerprint image is not matched with the template, a new template may be generated, and the partial fingerprint image may be stored as a registered image in association with the new template.

According to an aspect of another example embodiment, there is provided a method of authenticating a user based on fingerprint recognition, including: receiving, by a fingerprint sensor, a fingerprint of the user; receiving, by a processor, an input image that corresponds to at least a portion of the fingerprint of the user; determining, by the processor, from among a plurality of templates, whether an authentication template to be matched with the input image is present by comparing each respective one from among the plurality of templates with the input image; and when the authentication template is determined as being present, facilitating, by the processor, an authentication of the fingerprint, and updating, by the processor, the authentication template by using the input image.

When the authentication template is determined as being present, the fingerprint may be authenticated, and a number of authentication successes of the authentication template may be updated.

When the authentication template is determined as not being present, the authentication of the fingerprint may be rejected.

The method may further include: after the authentication template is updated by using the input image, determining, by the processor, whether at least one additional template, from among the plurality of templates, matches with the authentication template that has been updated, and when the at least one additional template is determined as being present, merging, by the processor, the authentication template that has been updated with the at least one additional template.

A first number of authentication successes of a new template generated by merging the authentication template that has been updated with the at least one additional template may be set to be equal to a sum of a second number of authentication successes of the authentication template that has been updated and a third number of authentication successes of the at least one additional template.

The method may further include arranging, by the processor, the plurality of templates based on a respective number of authentication successes of each of the plurality of templates.

The updating may include updating the authentication template based on at least one from among an area of an overlap region formed by overlapping a registered image included in the authentication template with the input image, and a normalized cross-correlation of the registered image and the input image calculated in the overlap region.

The authentication template may include a plurality of registered images and the overlap region may correspond to a region in which all of the plurality of registered images and the input image overlap each other.

According to another example embodiment, there is provided a fingerprint processing apparatus. The fingerprint processing apparatus includes a fingerprint sensor configured to receive at least a portion of a fingerprint as an input; and a processor. The processor is configured to divide an input image that corresponds to at least the portion of the fingerprint into a plurality of first regions; divide a registered image that has previously been stored into a plurality of second regions; select a first matching region from among the plurality of first regions and select a second matching region from among the plurality of second regions, based on a comparison between the plurality of first regions and the plurality of second regions; match the registered image with the input image by comparing the first matching region with the second matching region; and authenticate a user based on a result of the match.

The processor may be further configured to determine a plurality of matching probabilities that correspond to similarities between each of the plurality of first regions and each of the plurality of second regions; and determine the first matching region and the second matching region based on a highest matching probability from among the plurality of matching probabilities.

The processor may be further configured to determine the plurality of matching probabilities by determining phase correlations between each of the plurality of first regions and each of the plurality of second regions.

The processor may be further configured to determine a peak value of each of the phase correlations as the plurality of matching probabilities.

The processor may be further configured to detect a peak value of the phase correlations in order to generate a correction value to be used for performing a rotation transform of the registered image.

BRIEF DESCRIPTION OF DRAWINGS

The above and/or other aspects will be more clearly understood from the following detailed description taken in conjunction with the accompanying drawings, in which.

DETAILED DESCRIPTION

Hereinafter, example embodiments will be described with reference to the accompanying drawings.

Figure 1:
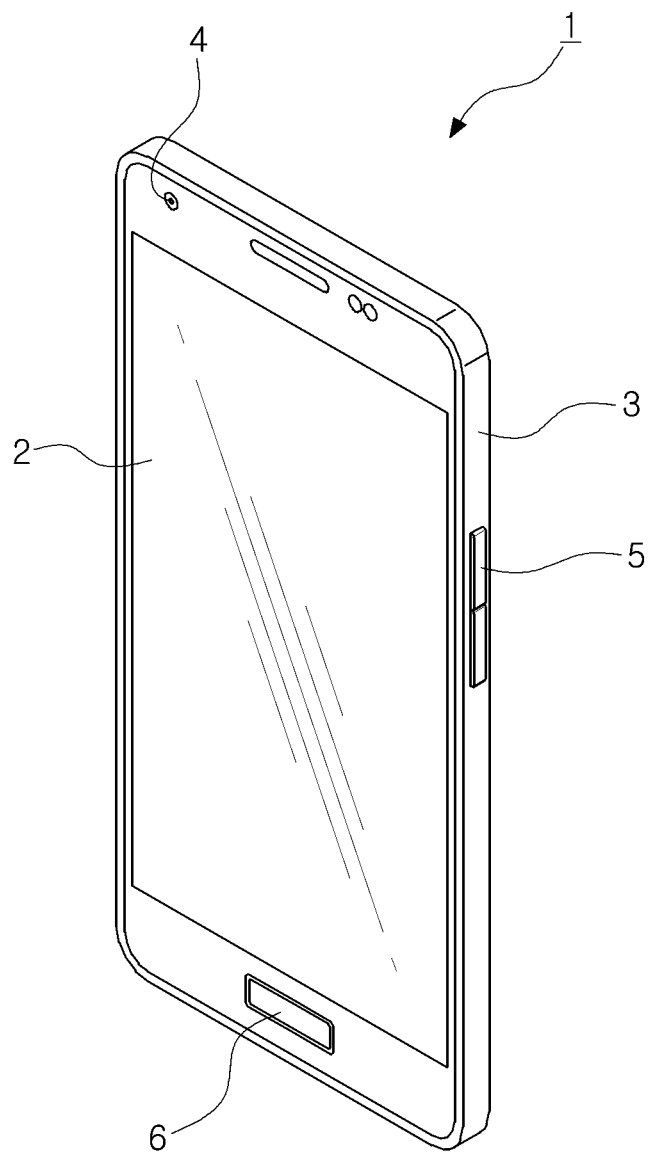
FIG. 1 is a view illustrating an electronic device, according to an example embodiment.

FIG. 1 is a view illustrating an electronic device, according to an example embodiment.

Referring to FIG. 1, an electronic device 1 according to an example embodiment may be a mobile device, and may include any of a smartphone, a tablet personal computer (PC), or the like, in an example embodiment. The electronic device 1 may include a display 2, a housing 3, a camera unit (also referred to herein as a "camera") 4, a key input unit (also referred to herein as a "key input component") 5, and a fingerprint sensor 6. In an example embodiment as illustrated in FIG. 1, the fingerprint sensor 6 may be integrated with a physical button that is located in a lower end of the display 2, and may also be provided in a position that is different from that illustrated in FIG. 1 or provided integrally with the display 2, in other example embodiments.

As applications providing financial and payment services in electronic devices such as smartphones, tablet PCs and the like have become widespread and the applications which are executable in electronic devices provide purchasing functions for specific goods or services, demand for enhanced security performance has increased. The fingerprint sensor 6 may be easily implemented to have a relatively small size in a limited form factor, and since the probability that respective individuals have the same fingerprint is extremely low, the fingerprint sensor 6 has been widely applied to various electronic devices.

However, if fingerprint recognition performance of the fingerprint sensor 6 is poor, a user who does not have user authorization for the electronic device 1 may acquire access rights to the electronic device 1 due to an erroneous sensing of the fingerprint sensor 6. Thus, in various example embodiments, a method for processing fingerprint information, in which the convenience of legitimate users may be improved via the fingerprint sensor 6 having improved fingerprint recognition performance in order to prevent a user that does not have user authorization for the device from accessing the electronic device 1, is provided.

The fingerprint sensor 6 may include a sensing unit (also referred to herein as a "sensor component") which is configured to acquire an image of a user fingerprint in various manners, and an image processing unit (also referred to herein as an "image processor") which is configured to process the image acquired by the sensing unit. The method for processing fingerprint information proposed by various example embodiments may be executed in the image processing unit. The image processing unit may be implemented as a separate processor connected to the fingerprint sensor 6 or an application processor configured to control operations of the electronic device 1.

Figure 2:
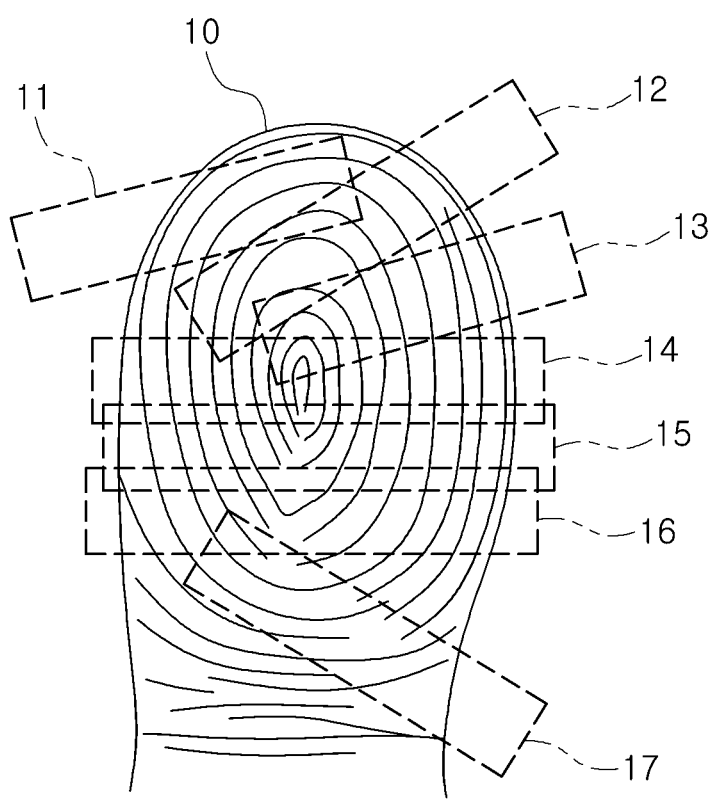
FIG. 2 is a diagram illustrating a fingerprint that may be recognized in a method for processing fingerprint information, according to an example embodiment.

FIG. 2 is a diagram illustrating a fingerprint that may be recognized in a method for processing fingerprint information, according to an example embodiment.

Referring to FIG. 2, a fingerprint 10 may be recognized by a fingerprint sensor, and in an example embodiment, the fingerprint sensor may have a smaller area than that of the fingerprint 10. In detail, in the case of a mobile device, it may be difficult to provide a fingerprint sensor that has a sensing area in which the entirety of the fingerprint 10 may be recognized within a limited area. Thus, the sensing area of the fingerprint sensor may be smaller than the fingerprint 10.

For example, when a sensing region of the fingerprint sensor is smaller than the fingerprint 10, fingerprint images 11, 12, 13, 14, 15, 16, and 17 generated by the fingerprint sensor may cover a portion of the fingerprint 10. In an enrollment stage of obtaining the fingerprint images 11, 12, 13, 14, 15, 16, and 17 from a user and storing the fingerprint images 11, 12, 13, 14, 15, 16, and 17 as a registered image, a plurality of the fingerprint images 11, 12, 13, 14, 15, 16, and 17 may be input and stored. At this time, regions of the fingerprint 10 covered by the plurality of fingerprint images 11, 12, 13, 14, 15, 16, and 17, respectively, may overlap each other. The registered image may be managed as a template, and a single template may include at least one of the fingerprint images 11, 12, 13, 14, 15, 16, and 17. One template may include two or more of the fingerprint images 11, 12, 13, 14, 15, 16, and 17, and in an example embodiment, the fourth, fifth, and sixth fingerprint images 14, 15, and 16 having an overlapping region may be included in one template to be managed as the template.

In a verification stage of recognizing a user who has input the fingerprint 10, the fingerprint images 11, 12, 13, 14, 15, 16, and 17 may be input and compared with a previously stored registered image or a template. At this time, a legitimate user may be erroneously recognized as an unauthorized user, or an unauthorized user may be recognized as a legitimate user, depending on a position and angle of the fingerprint 10 input by the user. Thus, in order to improve fingerprint recognition performance, various methods in which an input image may be matched with a registered image are provided.

Figure 3:
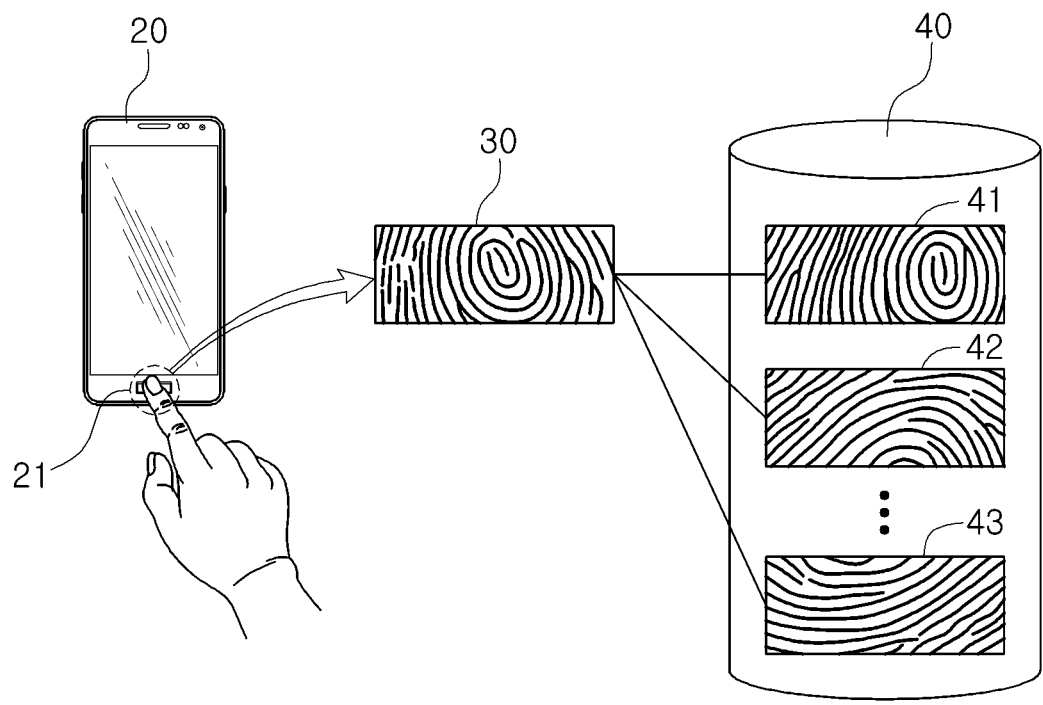
FIGS. 3 and 4 are schematic drawings illustrating a method for processing fingerprint information, according to an example embodiment.
Figure 4:
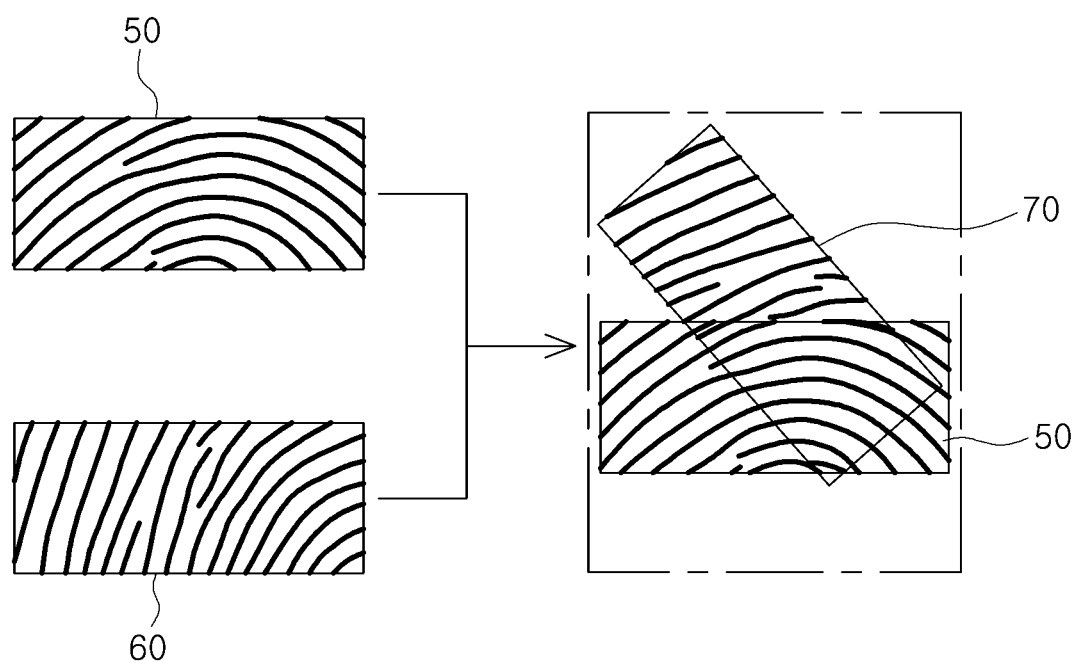

FIGS. 3 and 4 are schematic drawings illustrating a method for processing fingerprint information, according to an example embodiment. In example embodiments to be described with reference to FIGS. 3 and 4, the verification stage, in which an input image is received by a fingerprint sensor and is then compared with previously-stored registered images, to thus recognize a user, may be performed.

With reference to FIG. 3, a user may cause a user fingerprint to make contact with a fingerprint sensor 21 of an electronic device 20. The fingerprint sensor 21 may have a predetermined sensing region, and may generate an input image 30 from a portion of the fingerprint that is in contact with the sensing region. In an example embodiment, the input image 30 may only cover a portion of the fingerprint, but not the entirety of the fingerprint. The electronic device 20 may compare the input image 30 with a plurality of registered images 41, 42, and 43 stored in a memory 40 of the electronic device 20, and thus, may determine whether or not the fingerprint that has contacted the fingerprint sensor 21 is authenticated.

The input image 30 generated by the fingerprint sensor 21 may be determined based on a direction and a region in which the user touches the fingerprint sensor 21 with a user fingerprint. The electronic device 20 may compare the input image 30 with the registered images 41, 42, and 43, respectively, to select at least a portion of the registered images 41, 42, and 43 that have a relatively high correlation with the input image 30. An image processing method such as Fourier transform, log-polar transformation, or the like may be used to determine the correlation between the input image 30 and the registered images 41, 42, and 43.

With reference to FIG. 4, a registered image 60 having a relatively high correlation with an input image 50 may be selected, and the registered image 60 may be rotated by a predetermined angle according to a result of correlation analysis, to thus generate a rotated registered image 70. Whether or not the input image 50 and the rotated registered image 70 overlap each other may be determined, and an area of an overlap region in which the input image 50 and the rotated registered image 70 overlap each other, a matching score calculated for the overlap region, and the like, may be calculated, to determine whether or not the fingerprint that has generated the input image 50 is authenticated. In an example embodiment, the matching score may be a normalized cross-correlation (NCC) score.

In the example embodiment illustrated in FIG. 4, an entire region of the input image 50 and an entire region of the registered image 60 may be compared in order to calculate a correction value which includes an angle required for rotation of the registered image 60. The correction value may be obtained by applying image processing processes such as Fourier transform, log-polar transformation, and the like, to the entire region of each of the input image 50 and the registered image 60, and then analyzing a phase correlation therebetween. In this case, regions other than the overlap region that have a relatively high correlation with respect to each other may act as a noise component in the phase correlation analysis of the input image 50 and the registered image 60. Thus, the accuracy of the phase correlation analysis may be degraded, which may lead to degradation of fingerprint recognition performance with respect to the fingerprint that has generated the input image 50.

In various example embodiments, each of the input image 50 and the registered image 60 may be divided into a plurality of regions, and each of the plurality of regions may be subjected to image processing and then phase correlation analysis may be performed. Thus, in the phase correlation analysis, the influence of the remaining regions excluding the overlap region as noise components may be significantly reduced, and the fingerprint recognition performance may be improved.

Figure 5:
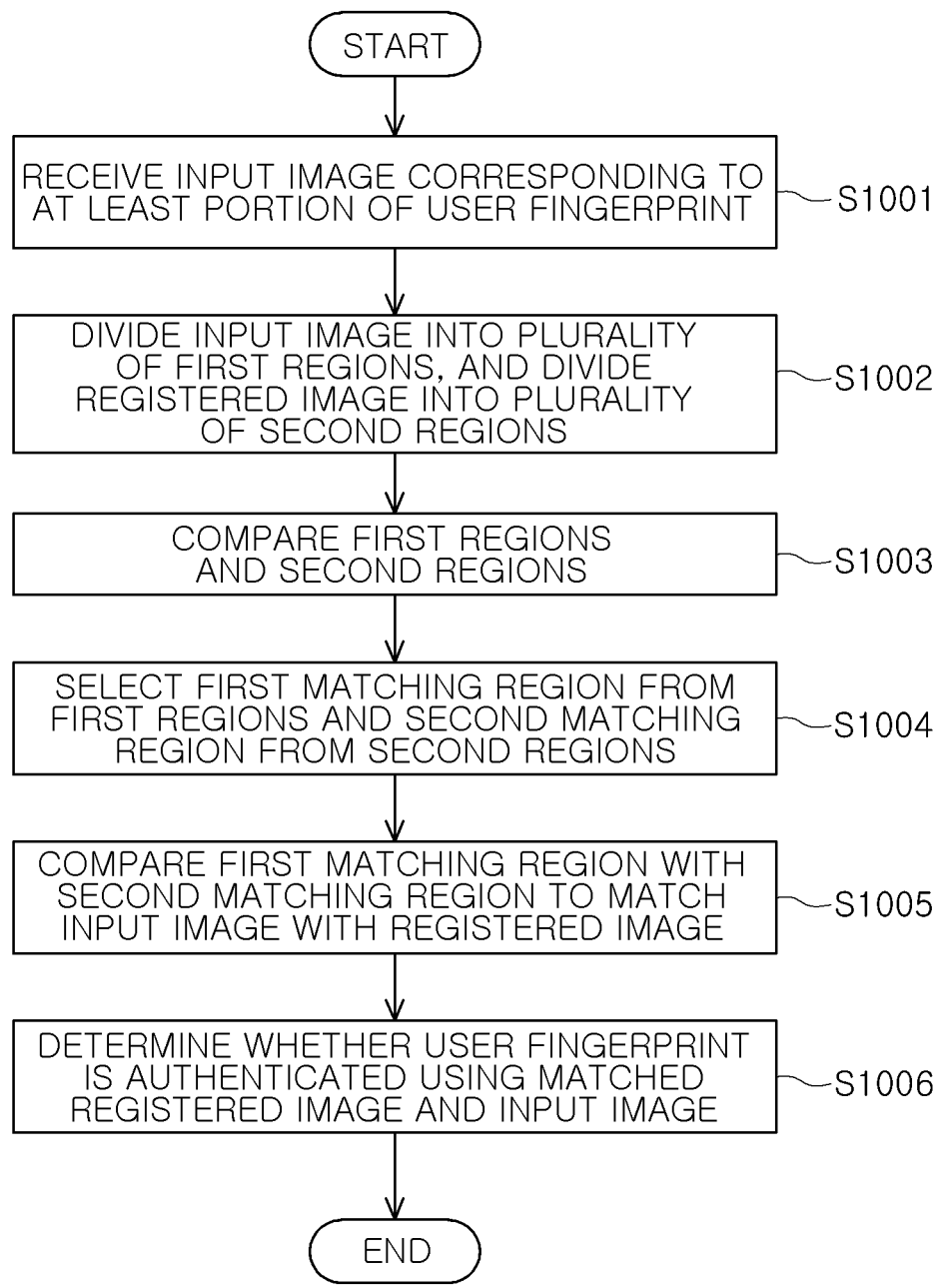
FIG. 5 is a flow chart illustrating a method for processing fingerprint information, according to an example embodiment.

FIG. 5 is a flow chart illustrating a method for processing fingerprint information, according to an example embodiment. In an exemplary embodiment, the method for processing fingerprint information to be described with reference to FIG. 5 may be executed by a processor of an electronic device that includes a fingerprint sensor.

Referring to FIG. 5, a method for processing fingerprint information according to an example embodiment may begin with receiving an input image that corresponds to at least a portion of a user fingerprint by a processor, in operation S1001. The operation S1001 may include generating an input image from at least a portion of the user fingerprint that is in contact with the sensing region of the fingerprint sensor. In an example embodiment, the input image may include a portion of the entire region of the user fingerprint.

The processor may divide the input image into a plurality of first regions, and may divide a registered image that has previously been stored in the electronic device, into a plurality of second regions in operation S1002. For example, when the registered image is provided as a plurality of registered component images, the processor may divide each of the plurality of registered component images into a plurality of second regions. Each of the plurality of first regions may have the same area, and each of the plurality of second regions may also have the same area. In an example embodiment, the first region and the second region may have the same area.

In the process of dividing the input image into the first regions, at least portions of the first regions may overlap each other. Similarly thereto, in the process of dividing the registered image into the second regions, at least portions of the second regions may overlap each other.

When the region division is completed, the processor may compare the first regions and the second regions with each other in operation S1003. In operation of S1003, each of the first regions may be compared with all of the second regions. In an example embodiment, for example, when an input image is divided into four first regions and each of two registered images is divided into three second regions, one first region may be compared with six second regions. For example, the image comparison process with respect to images of the first regions and the second regions may be performed a total of 24 times.

After the first and second regions are compared with each other, the processor may select a first matching region from among the first regions, and a second matching region from among the second regions in operation S1004. The first matching region and the second matching region may be the first region and the second region determined to have a highest correlation with each other in the comparison process of operation S1003.

The processor may compare the first matching region with the second matching region in order to match the input image with the registered image in operation S1005. For image matching in operation S1005, the processor may apply a rotation transform and a translation transform to at least one of the registered image and the input image. In an example embodiment, the processor may rotate and move the registered image having the second matching region to overlap at least portions of the registered image and the input image with respect to each other, and thus, may match the input image with the registered image.

The processor may determine whether the user fingerprint that has generated the input image is authenticated, by using the matched input image and registered image in operation S1006. By matching the registered image and the input image in operation S1005, the registered image and the input image may have an overlap region formed therebetween. The processor may determine whether to authenticate the user fingerprint that has generated the input image, based on at least one of an area of the overlap region and a matching score calculated in the overlap region.

Figure 6:
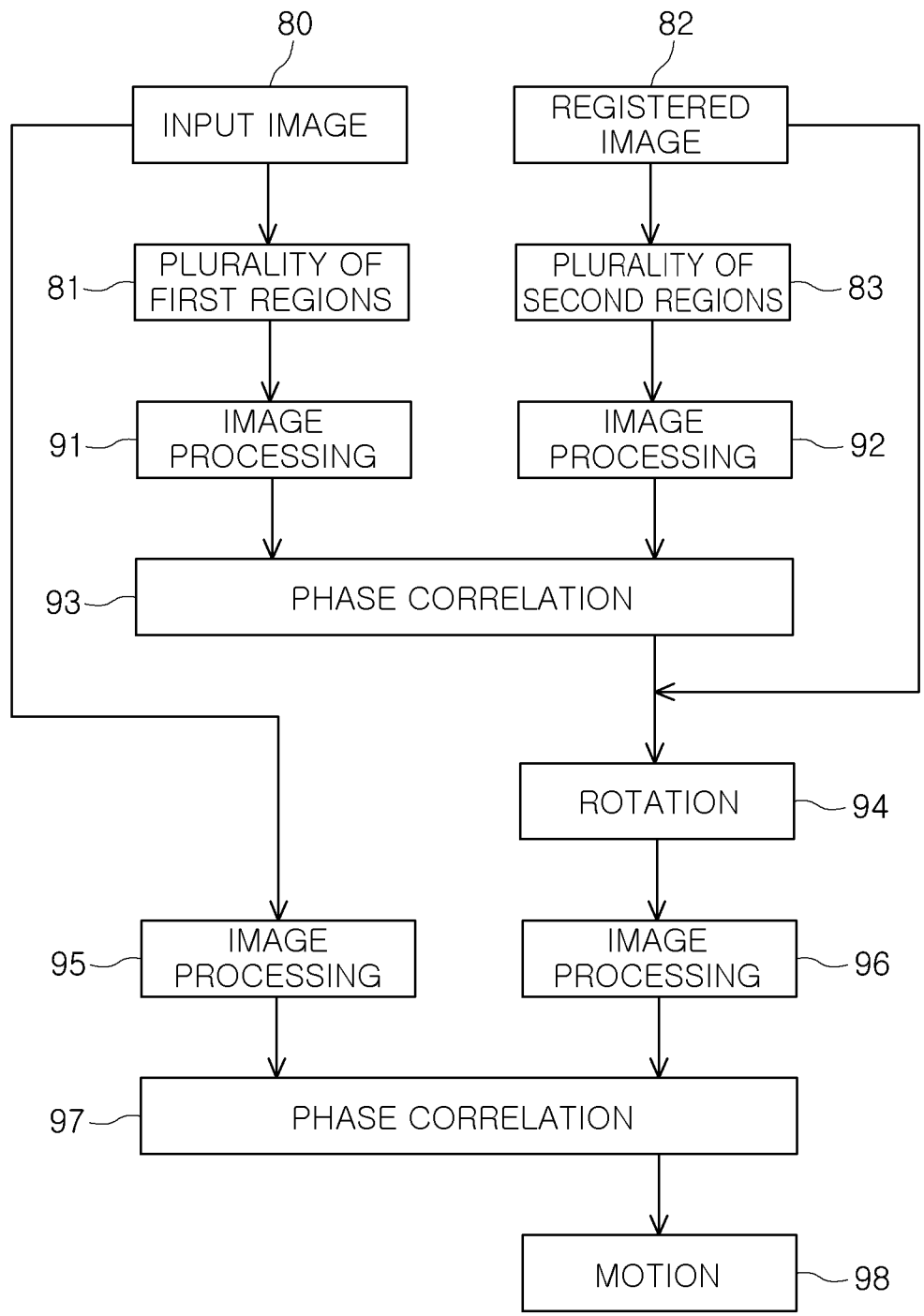
FIG. 6 is a schematic diagram illustrating an image matching method, according to an example embodiment.

FIG. 6 is a schematic diagram illustrating an image matching method, according to an example embodiment. In an example embodiment, the image matching method to be described with reference to FIG. 6 may be executed by a processor of an electronic device that includes a fingerprint sensor.

With reference to FIG. 6, an input image 80 may be divided into a plurality of first regions 81, and a registered image 82 may be divided into a plurality of second regions 83. The input image 80 and the registered image 82 may correspond to at least a portion of the user's fingerprint, and the registered image 82 may be an image that has previously been stored before the input image 80 is generated. In an example embodiment, the registered image 82 may include a plurality of registered component images, and in this case, the processor may divide each registered image 82 into a plurality of second regions 83.

When the region division is completed, the processor may perform image processing 91 for the first regions 81. The image processing 91 may include arithmetic operations such as Fourier transform, log-polar transform, and the like. In an example embodiment, by respectively applying a Fourier transform to the first regions 81, each magnitude component of the first regions 81 may be computed, and by reapplying the log-polar transform and the Fourier transform thereto, phase components of the first regions 81 may be calculated. Image processing 92 of the second regions 83 may also include operations which are similar to operations of the image processing 91 of the first regions 81.

When the image processing 91, 92 for the first regions 81 and the second regions 83 is completed, the processor may derive a phase correlation 93 by using phase components of the first regions 81 and phase components of the second regions 83. The phase correlation 93 may be represented by an association between the first regions 81 and the second regions 83, based on a phase change defined by an angle.

The processor may define an angle at which a peak value is represented in the phase correlation 93, as a first correction value to be used for performing a rotation transform of the registered image. In an example embodiment, when a peak value in the phase correlation 93 is 72 degrees, the processor may define the first correction value as 72 degrees, and may perform a rotation transform 94 by rotating the registered image 82 by 72 degrees.

When the rotation transform of the registered image 82 is completed, the processor may perform image processing 96 for the rotated registered image. In the example embodiment illustrated in FIG. 6, although the input image 80 is also illustrated as being subjected to image processing 95, in a manner different therefrom, the result of first image processing 91 executed after the region division may also be used. When the image processing operations 95 and 96 are completed, the processor may analyze a phase correlation 97 between the input image 80 and the rotated registered image.

As a result of the phase correlation 97, the processor may calculate a second correction value to be used for performing a translation transform of the rotated registered image. The processor may allow at least portions of the input image 80 and the registered image 82 to overlap each other and thus derive an overlap region, by moving the rotated registered image, based on the second correction value. As the overlap region is derived between the input image 80 and the registered image 82, the image matching process may be completed.

Figure 7:
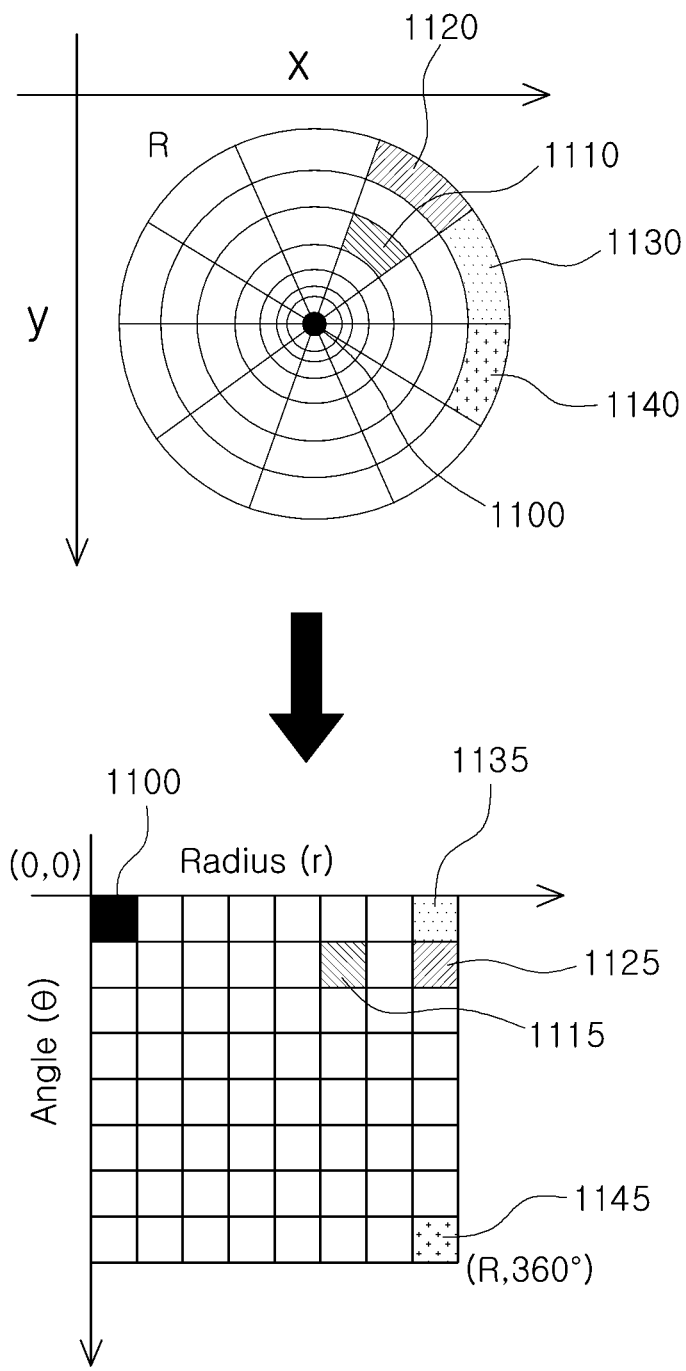
FIG. 7 is a diagram illustrating log-polar conversion, according to an example embodiment.

FIG. 7 is a diagram illustrating log-polar conversion, according to an example embodiment.

The log-polar conversion according to an example embodiment illustrated in FIG. 7 may be employed in at least one of the image processing operations 91, 92, 95 and 96 of the image matching method described above with reference to FIG. 6. Referring to FIG. 7, concentric circles may be set with respect to a center point 1100 in an orthogonal Cartesian coordinate system, and the concentric circles may be divided into a plurality of regions according to any one of a radius, an angle, a combination of a radius and an angle, and the like. The log-polar transformation may include a method in which the plurality of regions, defined on the orthogonal Cartesian coordinate system, are mapped to corresponding regions on a polar coordinate system.

Referring to the polar coordinate system, the center point 1100 of the orthogonal Cartesian coordinate system may be mapped to coordinates (0, 0°) of the polar coordinate system. In addition, first, second, third, and fourth regions 1110, 1120, 1130 and 1140 of the orthogonal Cartesian coordinate system may be mapped to first, second, third, and fourth regions 1115, 1125, 1135 and 1145 of the polar coordinate system, respectively.

Figure 8:
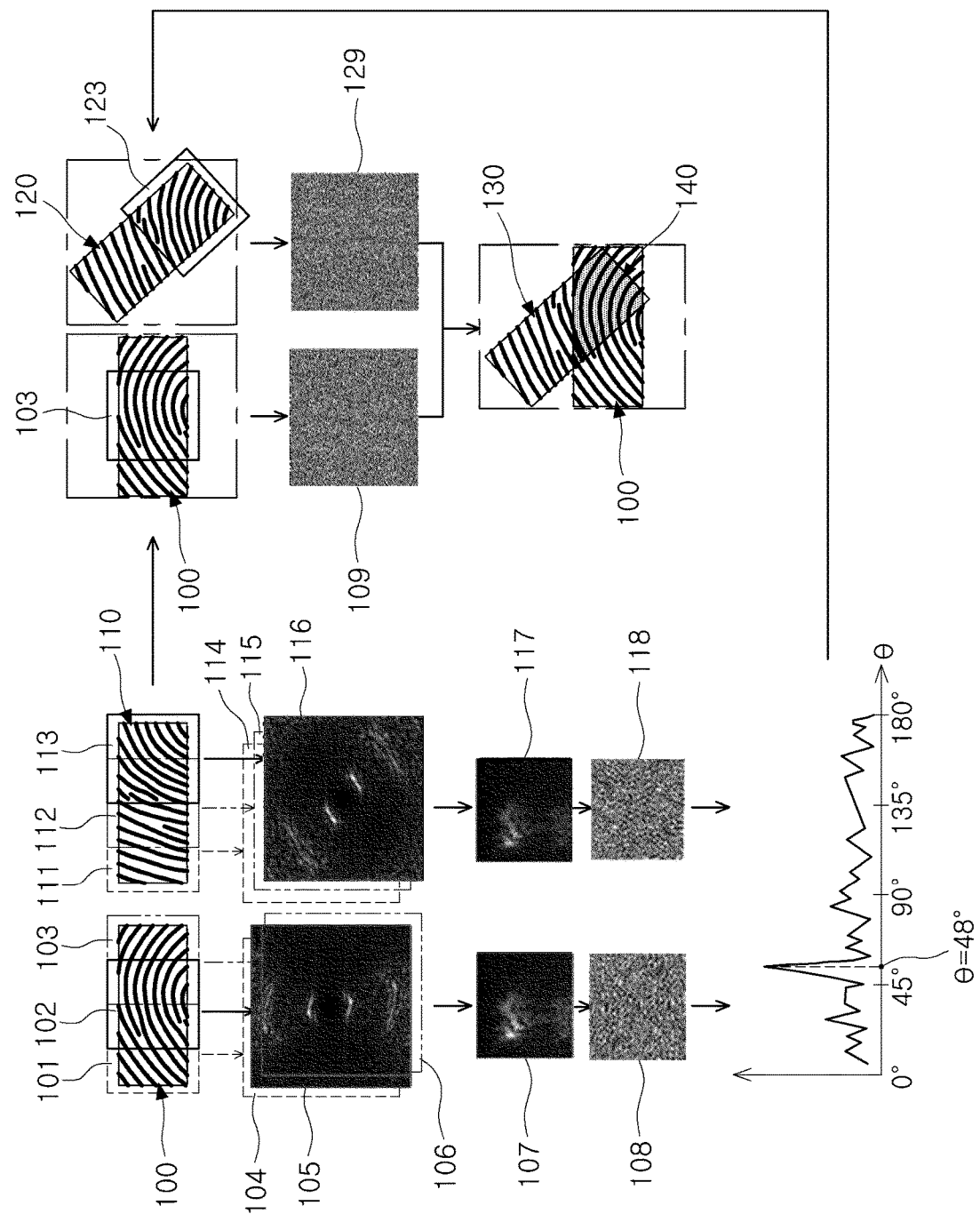
FIG. 8 is a view illustrating a method for processing fingerprint information, according to an example embodiment.

FIG. 8 is a view illustrating a method for processing fingerprint information, according to an example embodiment. In an example embodiment, the method for processing fingerprint information to be described with reference to FIG. 8 may be executed in a processor of an electronic device that includes a fingerprint sensor.

Referring to FIG. 8, the processor may compare an input image 100 with an original registered image 110 in order to determine whether a user's fingerprint that has generated the input image is authenticated. The input image 100 may be divided into a plurality of first regions 101, 102, and 103, and the original registered image 110 may be divided into a plurality of second regions 111, 112, and 113. In the example embodiment illustrated in FIG. 8, at least a portion of the first regions 101, 102, and 103 may overlap each other (i.e., a portion of first region 101 may overlap a portion of first region 102, and a portion of first region 102 may overlap a portion of first region 103), and the overlapped regions may have the same area. Similarly thereto, at least a portion of the second regions 111, 112, and 113 may overlap each other (i.e., a portion of second region 111 may overlap a portion of second region 112, and a portion of second region 112 may overlap a portion of second region 113), and the overlapped regions may have the same area. In addition, in an example embodiment, each of the first regions 101, 102, and 103 and the second regions 111, 112, and 113 may also have the same area.

The processor may convert pieces of information regarding time domains included in the first regions 101, 102, and 103 and the second regions 111, 112, and 113 into pieces of information 104, 105, and 106 and 114, 115, and 116 regarding frequency domains, respectively, by using a Fourier transform. The pieces of information 104, 105, and 106 and 114, 115, and 116 regarding frequency domains, generated by the Fourier transform, may be based on the orthogonal Cartesian coordinate system representing information as (x, y) coordinates. The pieces of information regarding time domains included in the first regions 101, 102, and 103 may be converted into the pieces of information 104, 105, and 106 regarding frequency domains, for example, pieces of first information 104, 105, and 106, and the pieces of information regarding time domains included in the second regions 111, 112, and 113 may be converted into the pieces of information 114, 115, and 116 regarding frequency domains, for example, pieces of second information 114, 115, and 116.

Subsequently, the processor may compare the pieces of first information 104, 105, and 106 with the pieces of second information 114, 115, and 116, and may select respective pieces of information having a highest correlation with each other, therefrom, as matching information. Referring to the example embodiment illustrated in FIG. 8, first matching information 105 may be selected from among the pieces of first information 104, 105, and 106, and second matching information 116 may be selected among pieces of second information 114, 115, and 116. The first matching information 105 may correspond to one of the plurality of first regions of the input image 100, for example, a first matching region 102, and the second matching information 116 may correspond to one of the plurality of second regions of the original registered image 110, for example, a second matching region 113.

The processor may respectively apply the log-polar transformation to the pieces of first and second matching information 105 and 116, in order to generate pieces of matching first and second polar coordinate information 107 and 117. The processor may generate first matching phase information 108 and second matching phase information 118 from the first and second matching polar coordinate information 107 and 117, respectively, by using a Fourier transform.

Then, the processor may perform a phase correlation by using the first matching phase information 108 and the second matching phase information 118, thereby obtaining a graph as illustrated in the example embodiment of FIG. 8. Referring to the graph shown at a lower left portion of FIG. 8, a peak value may be detected at an angle θ of 48 degrees, which may indicate that when the original registered image 110 is rotated by 48 degrees, the probability of matching between the original registered image 110 and the input image 100 is relatively highest. The processor may select the angle θ at which the peak value is detected, as a first correction value.

With reference to the example embodiment illustrated in FIG. 8, the processor may rotate the original registered image 110 by using the first correction value, in order to thereby generate a rotated registered image 120. A reference point at the time of performing a rotation transform of the original registered image 110 may be selected variably according to example embodiments, and the example embodiment illustrated in FIG. 8 may correspond to the case in which the rotation transform is performed based on a center point of the original registered image 110.

The processor may respectively generate input phase information 109 and registration phase information 129, by reapplying a Fourier transform to the input image 100 and the rotated registered image 120. Pieces of information included in the input phase information 109 and the registration phase information 129 may be based on a Cartesian coordinate system within which information is represented in (x, y) coordinates. Thus, the processor may generate a second correction value to be used for performing a translation transform of the rotated registered image 120 by comparing the input phase information 109 and the registration phase information 129 with each other. The processor may generate a reference registered image 130 for image matching by moving the rotated registered image 120 based on the second correction value.

With reference to FIG. 8, at least portions of the reference registered image 130 and the input image 100 may overlap with each other, and a region in which the reference registered image 130 and the input image 100 overlap each other may be defined as an overlap region 140. As an area of the overlap region 140 is increased, or as a similarity between the reference registered image 130 and the input image 100 in the overlap region 140 is increased, it may be determined that the input image 100 and the original registered image 110 are sufficiently similar to each other. For example, the processor may determine whether the input image 100 is authenticated, based on at least one of an area of the overlap region 140, and a matching score calculated in the overlap region 140. In an exemplary embodiment, the matching score may be calculated by performing a normalized cross-correlation (NCC).

Figure 9:
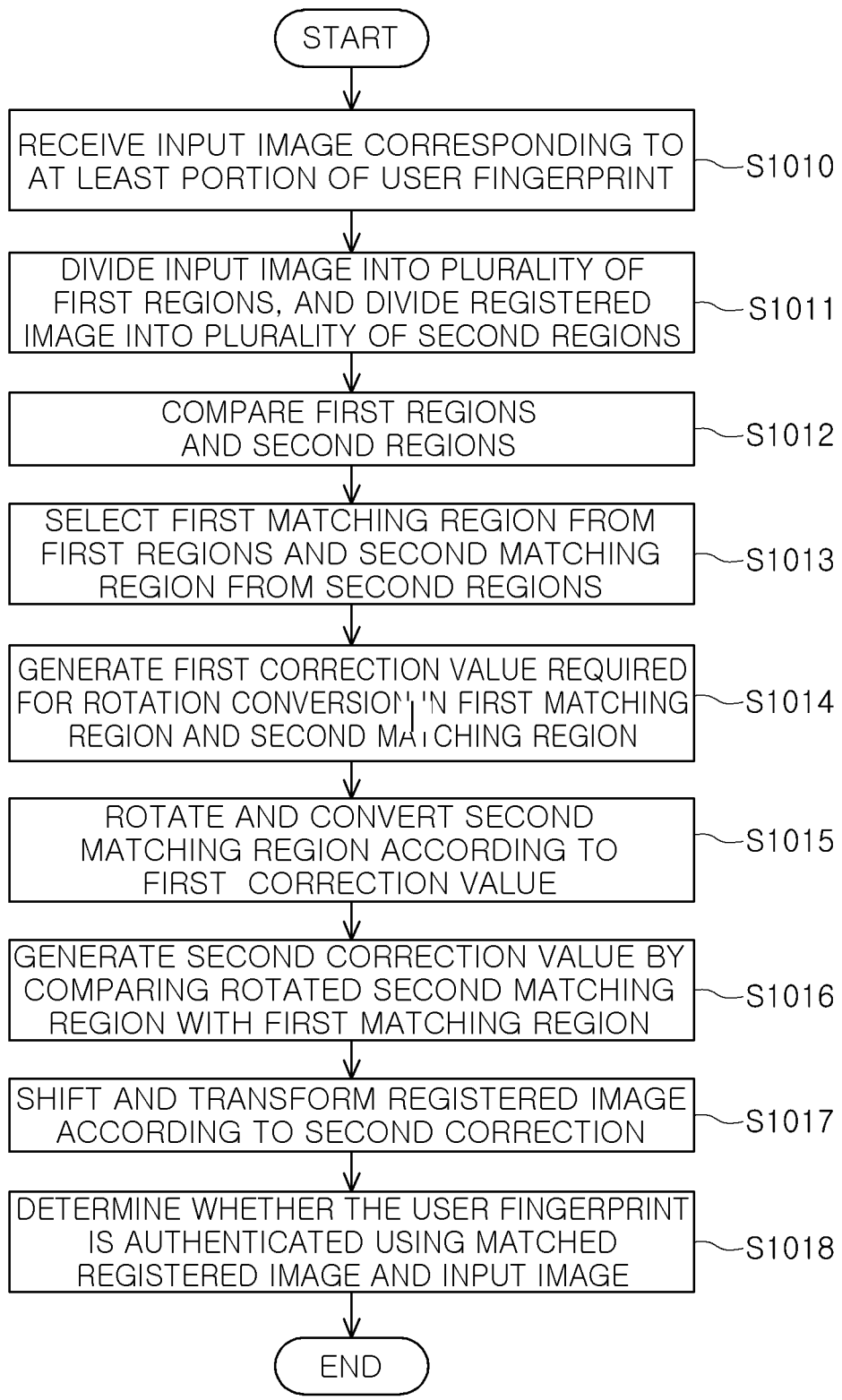
FIG. 9 is a flow chart illustrating a method for processing fingerprint information, according to an example embodiment.

FIG. 9 is a flow chart illustrating a method for processing fingerprint information, according to an example embodiment. In an example embodiment, a method for processing fingerprint information to be described with reference to FIG. 9 may be executed in a processor of an electronic device that includes a fingerprint sensor.

Referring to FIG. 9, a method for processing fingerprint information according to an example embodiment may begin with receiving an input image that corresponds to at least a portion of a user's fingerprint, in operation S1010. For example, when the input image is received, a processor may divide the input image into a plurality of first regions, and the processor may also divide a registered image into a plurality of second regions in operation S1011, and may compare the first regions and the second regions with each other in operation S1012. In this case, before comparing the first and second regions with each other, pieces of information regarding a time domain included in the first and second regions may be converted into pieces of information regarding a frequency domain in order to reduce a required amount of computation.

The processor may select a first matching region from the first regions and a second matching region from the second regions, based on a comparison result of the first regions and the second regions, in operation S1013. The first matching region and the second matching region may be respective regions determined to have a highest probability of matching from among the first regions and the second regions. The processor may generate a first correction value to be used for performing a rotation transform, by using the first matching region and the second matching region, in operation S1014.

The first correction value may be obtained by analyzing a phase correlation between the first matching region and the second matching region, and the second matching region may be rotated according to the first correction value in operation S1015. The processor may rotate the entirety of a registered image based on the first correction value, and thus, the second matching region may be rotated together therewith.

The processor may generate a second correction value by comparing the second matching region of the rotated registered image with the first matching region in operation S1016. The second correction value may be a value that corresponds to an amount of shift of the rotated registered image in order to be matched to the input image. In an example embodiment, the second correction value may be determined variably based on reference point coordinates of the rotation transform performed in operation S1015 in which the registered image is rotated and transformed by using the first correction value.

For example, when the second correction value is determined, the processor may shift the registered image according to the second correction value to match the registered image and the input image in operation S1017, and may determine whether the user fingerprint is authenticated therefrom in operation S1018. The authentication may be determined by using any of an area of an overlap region formed by overlapping the matched registered image and the input image, a matching score calculated in the overlap region, and the like.

Figure 10:
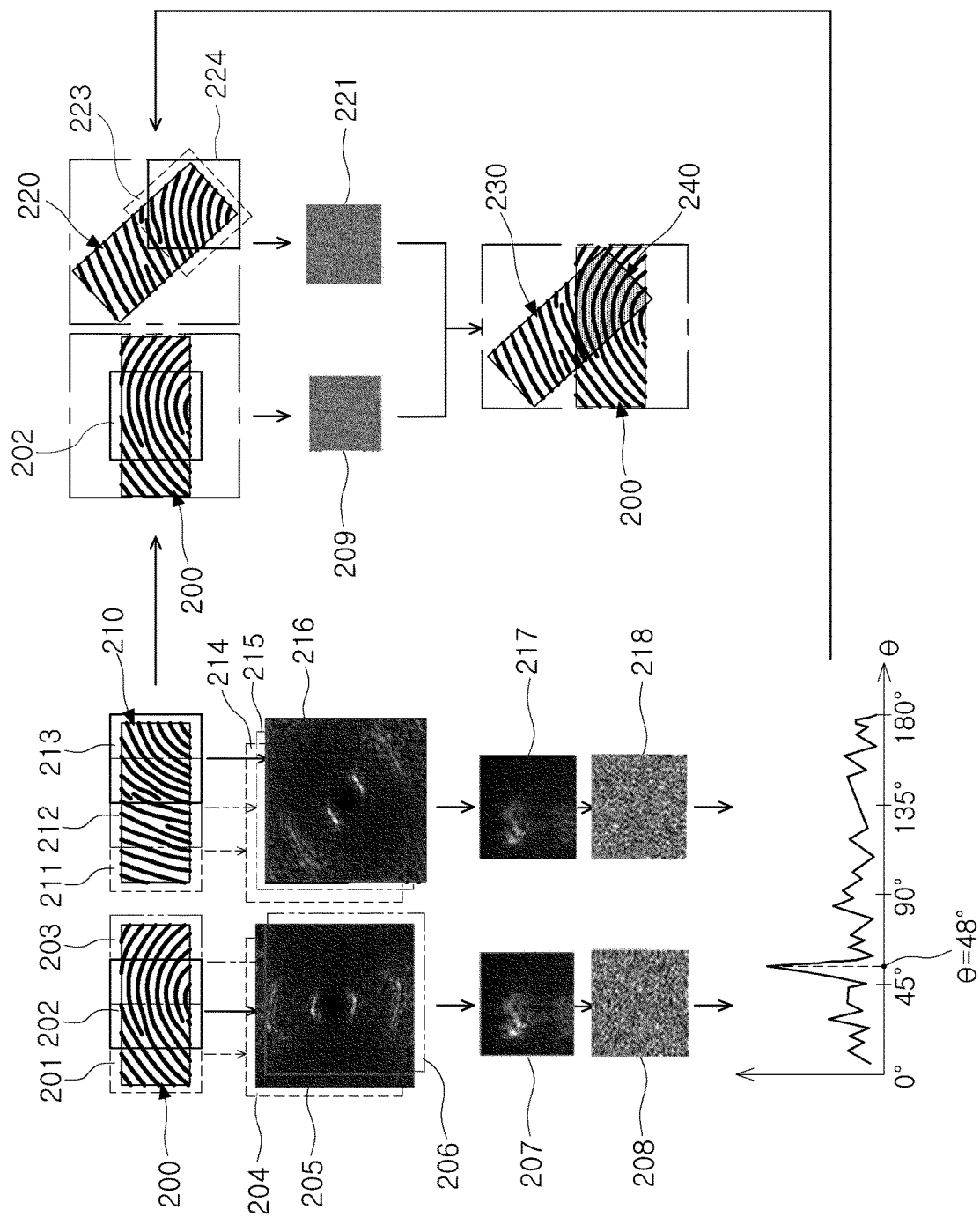
FIGS. 10 and 11 are views illustrating a method for processing fingerprint information, according to an example embodiment.
Figure 11:
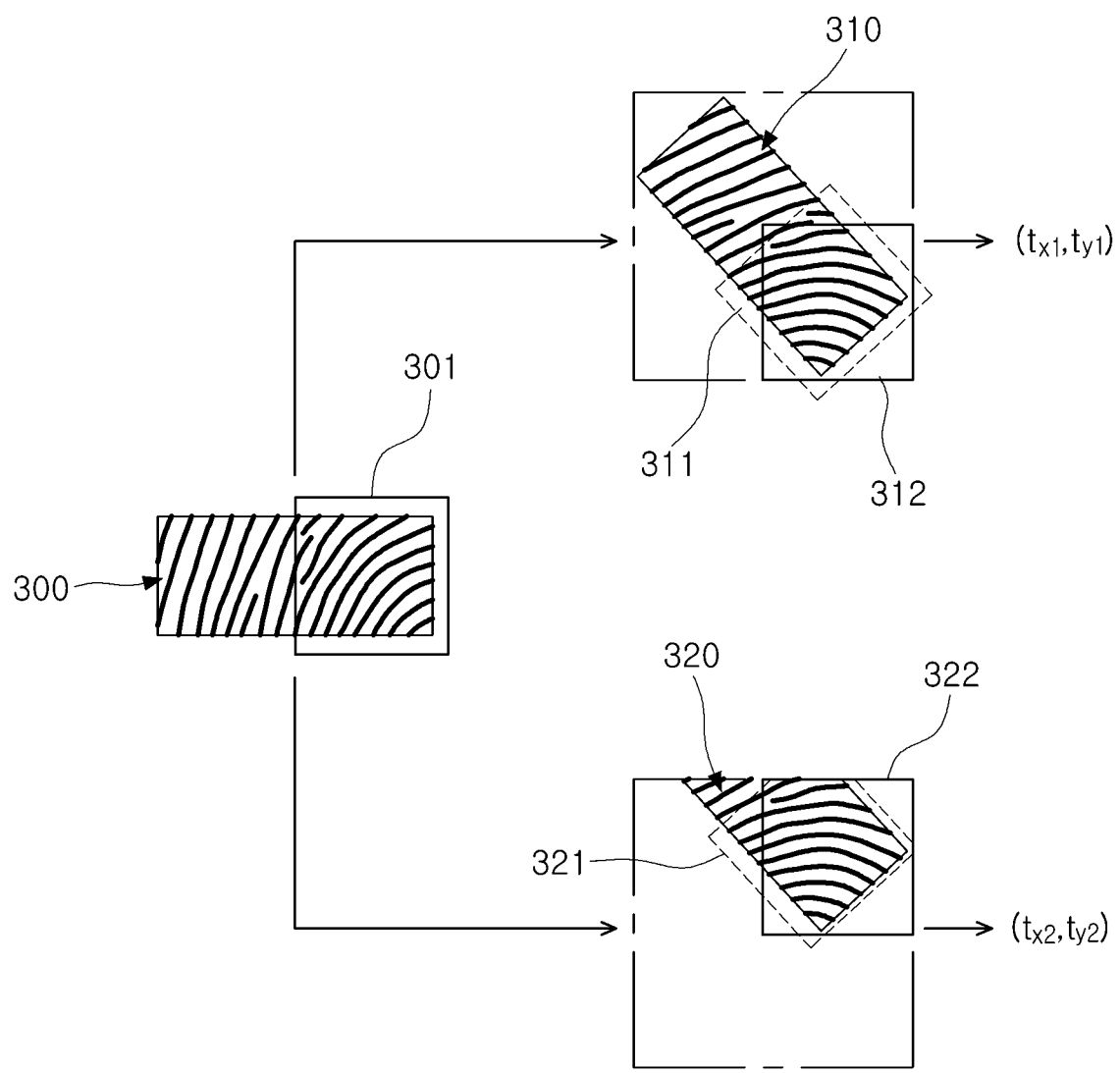

FIGS. 10 and 11 are views illustrating a method for processing fingerprint information, according to an example embodiment. In an example embodiment, a method for processing fingerprint information to be described with reference to FIGS. 10 and 11 may be executed in a processor of an electronic device that includes a fingerprint sensor.

With reference to FIG. 10, a processor may divide an input image 200 into a plurality of first regions 201, 202, and 203, and the processor may divide an original registered image 210 into a plurality of second regions 211, 212, and 213. In an example embodiment, each of the first regions 201, 202, and 203 and each of the second regions 211, 212, and 213 may also have the same area. In the example embodiment illustrated in FIG. 10, although the number of the first regions 201, 202, and 203 included in a single input image 200 and the number of the second regions 211, 212, and 213 included in a single original registered image 210 are assumed to be equal to each other, in a manner different therefrom, the number of the first regions 201, 202, and 203 may also be different from the number of the second regions 211, 212, and 213.

The processor may convert pieces of information regarding time domains included in the first regions 201, 202, and 203 and the second regions 211, 212, and 213 into pieces of information 204, 205, and 206 and 214, 215, and 216 regarding frequency domains, respectively, by using a Fourier transform. The processor may compare the pieces of information 204, 205, and 206 and 214, 215, and 216, for example, the pieces of first information 204, 205, and 206 with the pieces of second information 214, 215, and 216 in frequency domains, respectively, and may thus select respective pieces of information having a highest correlation with respect to each other, as matching information. Referring to the example embodiment illustrated in FIG. 10, first matching information 205 may be selected from the pieces of first information 204, 205, and 206, and second matching information 216 may be selected from the pieces of second information 214, 215, and 216. The first matching information 205 may correspond to a first matching region 202 of the input image 200, and the second matching information 216 may correspond to a second matching region 213 of the original registered image 210.

The processor may generate pieces of matching first and second polar coordinate information 207 and 217 by applying a log-polar transformation to each of the pieces of first and second matching information 205 and 216, and may generate first matching phase information 208 and second matching phase information 218 from the pieces of matching first and second polar coordinate information 207 and 217, respectively, by using a Fourier transform. Then, the processor may calculate a phase correlation between the pieces of first and second matching phase information 208 and 218, and thus, may calculate a first correction value to be used for performing a rotation transform of the original registered image 210.

Referring to a graph of the phase correlation illustrated in a lower left portion of FIG. 10, a peak value may be detected at an angle θ of 48 degrees, which indicates that when the original registered image 210 is rotated by 48 degrees, a probability of matching between the original registered image 210 and the input image 200 is relatively highest. The processor may select the angle θ at which the peak value is detected, as the first correction value.

With reference to the example embodiment illustrated in FIG. 10, the processor may rotate the original registered image 210 by using the first correction value, thereby generating a rotated registered image 220. A reference point at the time of performing the rotation transform of the original registered image 210 may be selected variably according to an example embodiment. The processor may respectively generate input phase information 209 and registration phase information 221, by reapplying a Fourier transform to the input image 200 and the rotated registered image 220.

A second matching region 223 of the rotated registered image 220 may correspond to the second matching region 213 of the original registered image 210. In the example embodiment illustrated in FIG. 10, the processor may set a conversion target region 224 that includes the second matching region 223 in the rotated registered image 220, and may apply a Fourier transform to each of the conversion target region 224 and the first matching region 202. Thus, an amount of calculation may be reduced as compared with the case in which the Fourier transform is applied to the entirety of the input image 100 and the rotated registered image 120 as in the example embodiment of FIG. 8. In the example embodiment illustrated in FIG. 10, the input image 200 and the rotated registered image 220 may each have a resolution of 128×128, and the first matching region 202 and the conversion target region 224 may each have a resolution of 64×64. Thus, by only applying a Fourier transform to the first matching region 202 and the conversion target region 224, the amount of required calculation may be significantly reduced.

The processor may calculate a second correction value to be used for performing a translation transform by comparing the input phase information 209 and the registration phase information 229 generated via the Fourier transform with each other. A reference registered image 230 may be generated by moving the rotated registered image 220 based on the second correction value, and the reference registered image 230 may overlap the input image 200 to provide an overlap region 240. The processor may determine whether or not the input image 200 is authenticated, based on at least one of an area of the overlap region 240, and a matching score calculated with respect to the overlap region 240.

Conversely, the second correction value may be determined variably based on a position in which the reference point is set when the original registered image is rotated based on the first correction value. Referring to FIG. 11, a second matching region 301 may be selected in an original registered image 300, and a first correction value may be calculated by comparing the selected second matching region with a first matching region of an input image. For example, when the original registered image 300 is rotated by using the first correction value, a second correction value in a case in which the original registered image 300 is rotated based on a center of the original registered image 300 and a second correction value in a case in which the original registered image 300 is rotated based on a center of the second matching region 301 may be calculated differently.

With reference to FIG. 11, for example, when the rotation transform is performed based on a center of the original registered image 300, a second matching region 311 and a conversion target region 312 may be disposed at a right lower end of a rotated registered image 310. In this case, the calculated second correction value may be $(t_{x1}, t_{y1})$. Conversely, for example, when the rotation transform is performed based on a center of the second matching region 301, a second matching region 321 and a conversion target region 322 may be disposed at a right upper end of a rotated registered image 320. In this case, the calculated second correction value may be $(t_{x2}, t_{y2})$, which may be a value that is different from the corresponding value $(t_{x1}, t_{y1})$ of the foregoing case described above.

Figure 12:
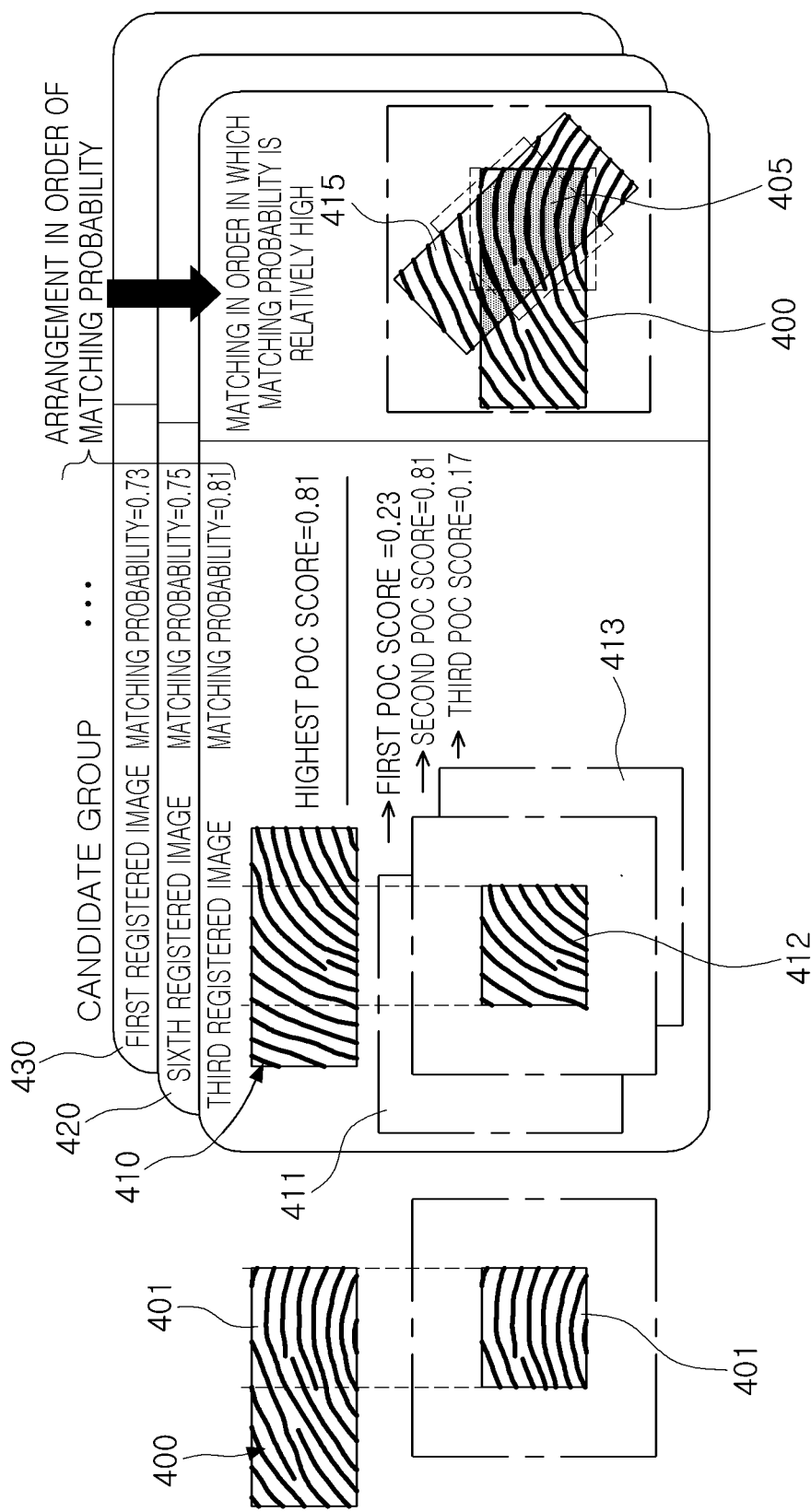
FIG. 12 is a diagram illustrating a user authentication method, according to an example embodiment.

FIG. 12 is a diagram illustrating a user authentication method, according to an example embodiment. In an example embodiment, the user authentication method to be described with reference to FIG. 12 may be executed in a processor of an electronic device that includes a fingerprint sensor.

In the example embodiment illustrated in FIG. 12, an input image 400 may be compared with each of a plurality of registered images. The number of registered images may vary, depending on an example embodiment, and a processor may compute a matching probability between each of the registered images and the input image 400 by comparing the input image 400 with the registered images. The matching probability may be calculated from a phase correlation between first regions generated by dividing the input image 400 and second regions generated by dividing each of the registered images. In an example embodiment, the processor may compare a peak value appearing in phase correlations between the first and second regions with a predetermined threshold value, and may select only registered images that have a phase correlation with a peak value which is greater than the threshold value, as a candidate group.

The candidate group selection may be derived from a phase correlation which is performed in order to obtain a first correction value to be used for performing a rotation transform. Referring to a third registered image 410 in the example embodiment illustrated in FIG. 12, the third registered image 410 may be divided into three second regions 411, 412 and 413, and a phase correlation between each of the second regions 411, 412 and 413 and a first region 401 of the input image 400 may be obtained. As a result of the phase correlation analysis, for example, when the peak value of the phase correlation between the second region 412 and the first region 401 of the input image 400 has a highest value of 0.81, a matching probability of the third registered image 410 may be determined to be 0.81. For example, the matching probability of each of the registered images may be defined by a highest peak value acquired from the phase correlation obtained by comparing the second regions obtained by dividing each of the registered images with the first regions of the input image.

The processor may determine whether a user's fingerprint is authenticated by matching the input image 400 with each of candidate registered images 410, 420 and 430 included in the candidate group. In this aspect, in order to significantly reduce an amount of calculation to match the input image 400 with the candidate registered images 410, 420 and 430, the processor may sort the candidate registered images 410, 420 and 430 in a sequential order that corresponds to the matching probability. Referring to FIG. 12, starting with the third registered image 410 which has a highest matching probability (e.g., 0.81), the sixth registered image 420 (which has a matching probability of 0.75) and the first registered image 430 (which has a matching probability of 0.73) may be sequentially matched with the input image 410.

The matching of the third registered image 410 and the input image 400 may be performed by rotating and moving the third registered image 410 to be converted into a third reference registered image 415. The processor may calculate an area of an overlap region 405 in which the third reference registered image 415 and the input image 400 overlap each other and a matching score with respect to the overlap region 405. For example, when the area of the overlap region 405 and the matching score with respect to the overlap region 405 do not satisfy predetermined criteria, the processor may match the input image 400 with the sixth registered image 420 and then may determine whether the input image 400 is authenticated. If the input image 400 is not authenticated for any of the candidate registered images 410, 420 and 430 included in the candidate group in a manner similar thereto as described above, the processor may ultimately determine that the authentication is to be rejected. Meanwhile, when the input image 400 is authenticated for any one of the candidate registered images 410, 420 and 430 included in the candidate group, the processor may provide an authentication permission judgment for the input image 400, regardless of an authentication result for the other subordinate registered images.

FIGS. 13, 14A, 14B, 14C, and 14D are views illustrating a method for processing fingerprint information, according to an example embodiment. In an example embodiment, the method for processing fingerprint information to be described with reference to FIGS. 13, 14A, 14B, 14C, and 14D may be executed in a processor of an electronic device that includes a fingerprint sensor.

Figure 13:
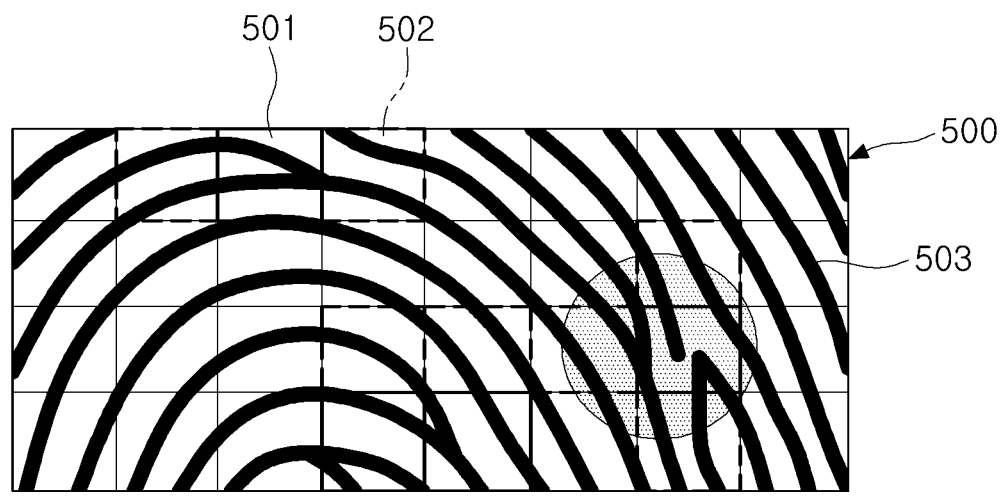
FIGS. 13, 14A, 14B, 14C, and 14D are views illustrating a method for processing fingerprint information, according to an example embodiment.

Referring to FIG. 13, a fingerprint image 500, which may become an input image or a registered image, may be divided into a plurality of sub-regions. The sub-regions may include a first sub-region 501, a second sub-region 502 and a third sub-region 503. The first sub-region 501 may be a region that includes minutiae which appear in a fingerprint of a person, and the second sub-region 502 may be a region that is adjacent to the first sub-region 501. The third sub-region 503 may be defined as a region other than the first and second sub-regions 501 and 502.

As in the example embodiment illustrated in FIG. 13, the fingerprint image 500 may be divided into a plurality of sub-regions, and different respective weights may be assigned to each of the first, second, and third sub-regions 501, 502, and 503, to be used for authentication of a user fingerprint. In this case, a security problem, in which an input image generated from a fingerprint of a user not having user authorization for a device may accidentally overcome the registered image, may occur.

FIGS. 14A, 14B, 14C, and 14D are diagrams illustrating examples of distribution of various types of minutiae represented in a fingerprint. First, referring to FIG. 14A, a total of three unique regions 601a that include minutiae may be included in a fingerprint image 600a. However, an area of the unique region 601a that has the minutiae may be smaller than that of a general region 602a. A weight assigned to the unique region 601a may be higher than a weight assigned to the general region 602a. In an example embodiment, even when a user's fingerprint that has a region that coincides with the general region 602a excluding the unique regions 601a is input, user authentication may be denied unless a minutiae is detected commonly in the unique regions 601a.

Figure 14A:
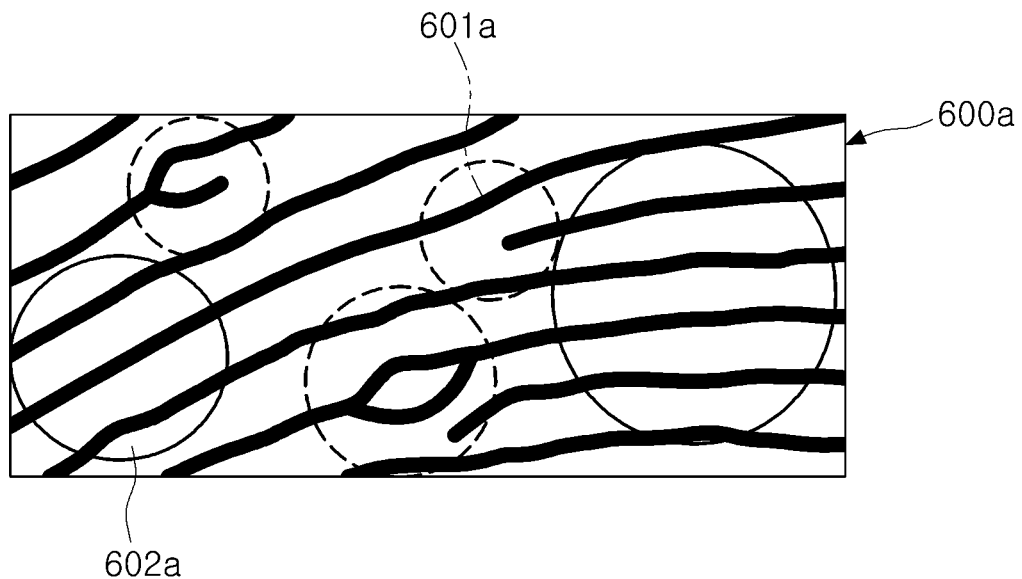
Figure 14B:
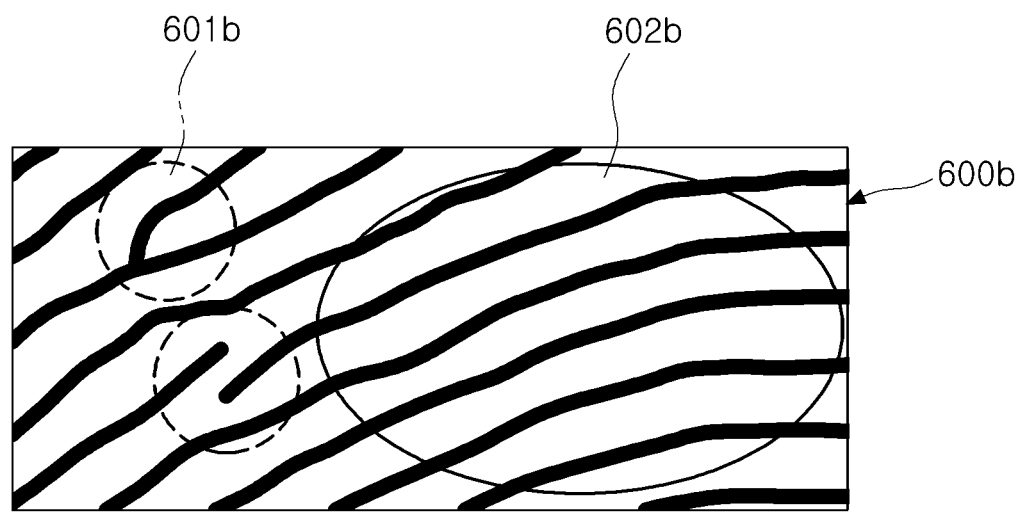
Figure 14C:
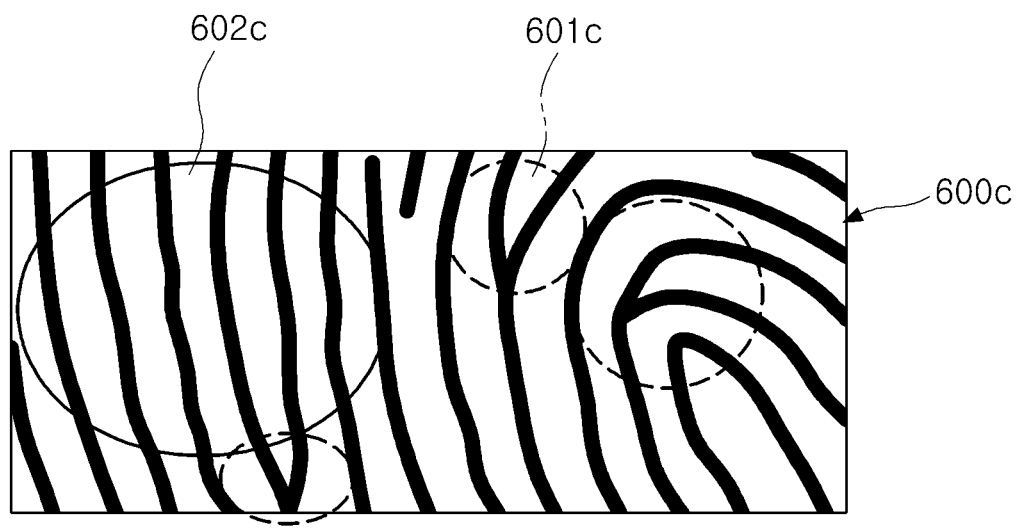
Figure 14D:
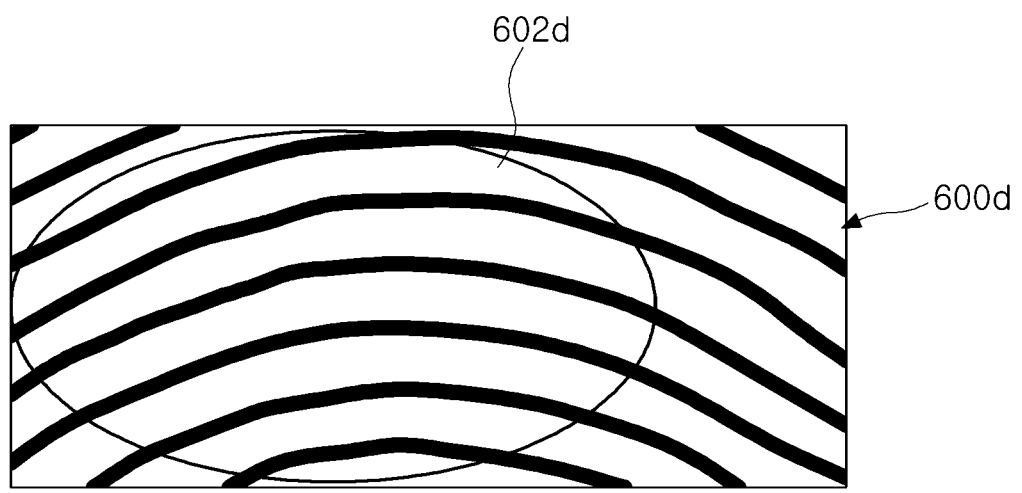

In FIGS. 14B, 14C, and 14D, a user authentication method which is similar to that in the foregoing example embodiment described with reference to FIG. 14A may also be applied. Referring to FIG. 14B, two unique regions 601b may be present in a fingerprint image 600b, and a general region 602b may have a much larger area than areas of the two unique regions 601b. For example, in a case in which a user's fingerprint that coincides with the general region 602b is input, in an existing user authentication method, an overlap region may be sufficiently secured and a normalized cross-correlation in the overlap region is also calculated to have a relatively high value, and thus, user authentication may be allowed. However, in an example embodiment, as a weight is assigned to the two unique regions 601b, in a case in which only the general region 602b coincides with a user's fingerprint, the user authentication may be rejected.

In an example embodiment illustrated in FIG. 14C, a weight may also be assigned to three feature points 601c, and user authentication may not be permitted when only a general region 602c coincides therewith. In a fingerprint image 600d illustrated in FIG. 14D, a unique region that has minutiae may not be present. Thus, in a case in which the fingerprint image 600d illustrated in FIG. 14D is input, user authentication may not be permitted.

Figure 15:
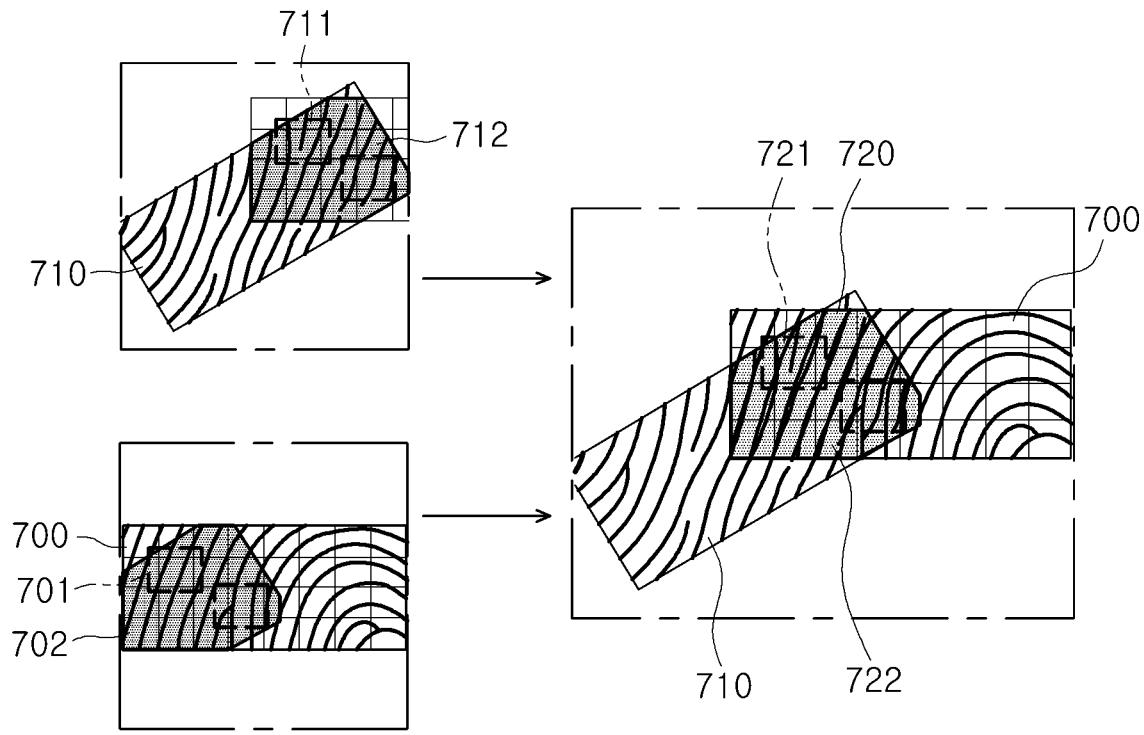
FIGS. 15 and 16 are views illustrating a user authentication method, according to an example embodiment.
Figure 16:
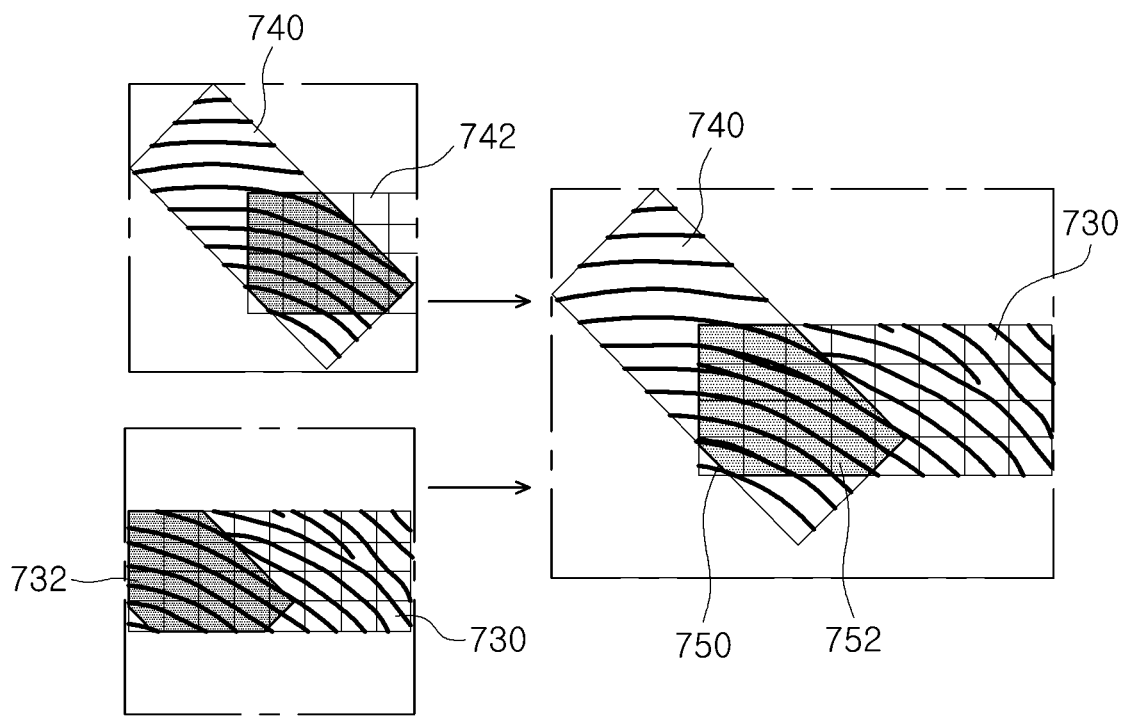

FIGS. 15 and 16 are views illustrating a user authentication method, according to an example embodiment. In an example embodiment, a user authentication method to be described with reference to FIGS. 15 and 16 may be executed in a processor of an electronic device that includes a fingerprint sensor.

Referring first to FIG. 15, an input image 700 and a reference registered image 710 that have been subjected to a rotation transform and a translation transform for image matching are illustrated. Each of the input image 700 and the reference registered image 710 may be divided into a plurality of sub-regions, and the plurality of sub-regions may be weighted according to whether minutiae are retained. In an example embodiment, a respective weight may be assigned to each of a first sub-region 701 included in the input image 700 and a first sub-region 711 included in the reference registered image 710. Conversely, a weight may not be assigned to each of a second sub-region 702 included in the input image 700 and a second sub-region 712 included in the reference registered image 710.

The reference registered image 710 and the input image 700 may be matched to form an overlap region 720. A processor may determine whether to authenticate the input image 700, based on at least one of an area of the overlap region 720 and a matching score calculated with respect to the overlap region 720. In the example embodiment illustrated in FIG. 15, the processor may assign a weight to a first sub-region 721 located in the overlap region 720, but may not assign a weight to a second sub-region 722. Thus, as the overlap region 720 has an increased amount of minutiae, a matching score of the input image 700 may increase and an authentication success probability may be increased.

Next, referring to FIG. 16, an input image 730, and a reference registered image 740 that have been subjected to a rotation transform and a translation transform for image matching are illustrated. Each of the input image 730 and the reference registered image 740 may be divided into a plurality of sub-regions 732 and 742, and the plurality of sub-regions may be weighted according to whether minutiae are retained therein. In the example embodiment illustrated in FIG. 16, minutiae may not be present in each of sub-regions 752 of an overlap region 750 in which the input image 730 and the reference registered image 740 are matched with each other. Thus, in the example embodiment illustrated in FIG. 16, a matching score in the overlap region 750 may be relatively low, and thus, user authentication of the input image 730 may be denied.

For example, when determining whether to authenticate the input image 730 by using only an area of the overlap region 750 and a matching score within the overlap region 750, authentication of the input image 730 may also be allowed. However, in the example embodiment, in a process of calculating the matching score in the overlap region 750, a weight may be assigned to a sub-region that has minutiae. Thus, in the example embodiment of FIG. 16 in which no minutiae are included in the overlap region 750, the authentication of the input image 730 may be rejected, and security performance may be improved.

Figure 17:
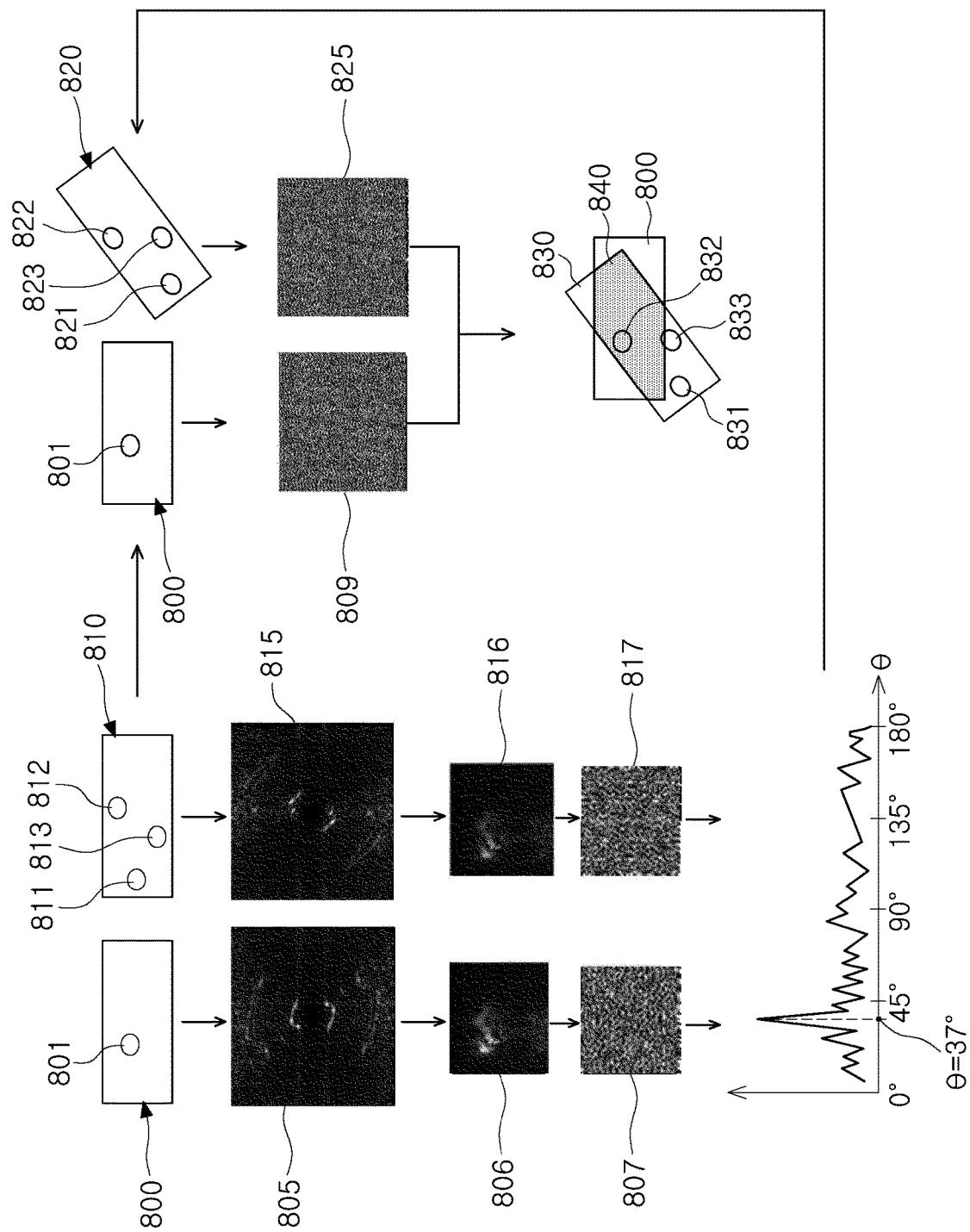
FIGS. 17 and 18 are views illustrating a method for processing fingerprint information, according to an example embodiment.
Figure 18:
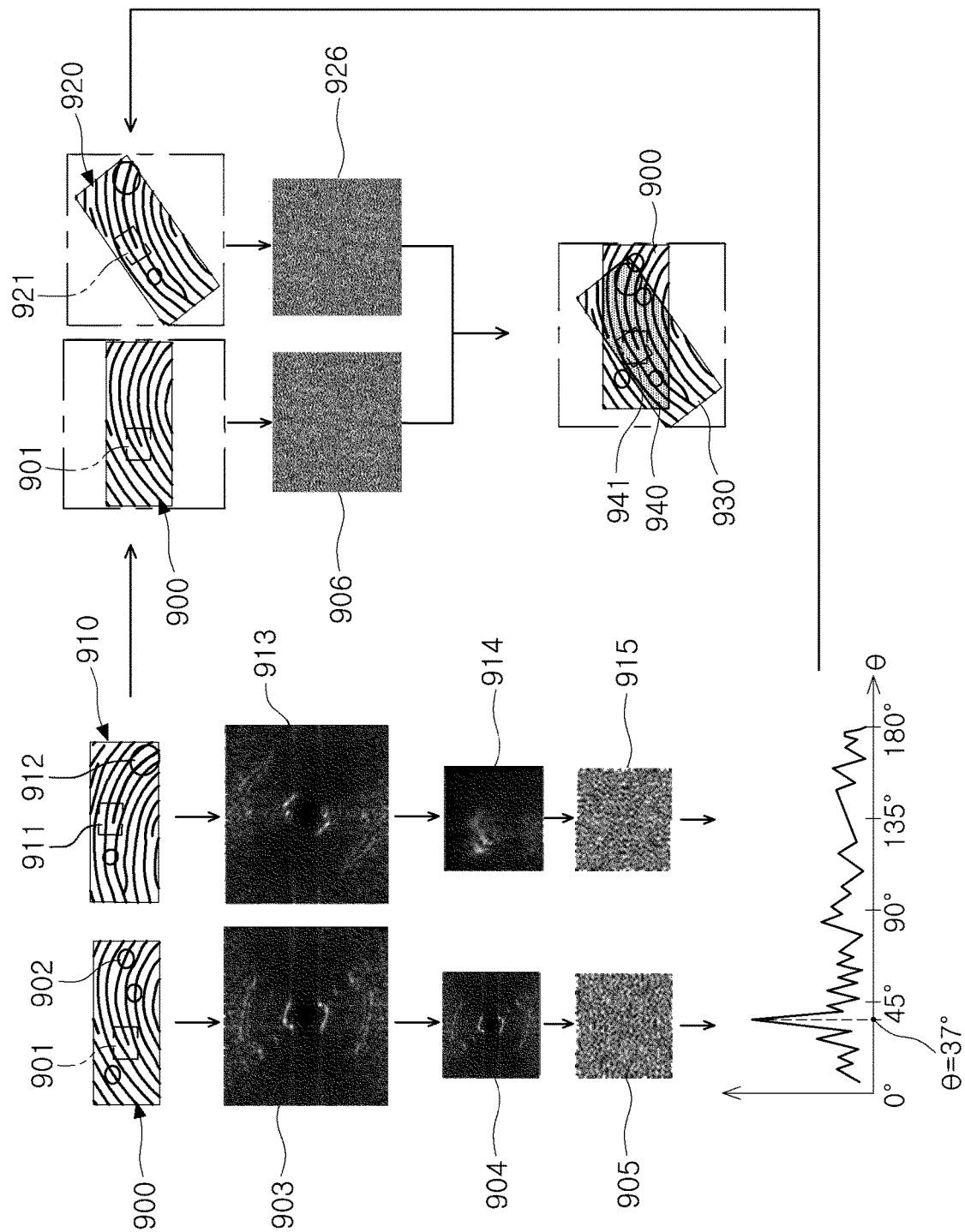

FIGS. 17 and 18 are views illustrating a method for processing fingerprint information, according to an example embodiment. In an example embodiment, a method for processing fingerprint information to be described with reference to FIGS. 17 and 18 may be executed in a processor of an electronic device that includes a fingerprint sensor.

Referring to FIG. 17, a processor may compare an input image 800 with a registered image 810 in order to determine whether a user fingerprint that has generated the input image is authenticated. In this case, both the input image 800 and the registered image 810 do not include information regarding an image captured from a shape of an intact fingerprint, but may only include information regarding a feature point present in the fingerprint. For example, the feature point may include minutiae of the fingerprint. As both the input image 800 and the registered image 810 do not store the imaged information, security performance may be further enhanced. Since both the input image 800 and the registered image 810 include only information regarding a feature point, the influence of noise components that might otherwise occur in a phase correlation analysis may be reduced, and thus, a process of dividing the input image 800 and the registered image 810 into a plurality of regions may also be omitted.

Matching and authentication processes of the input image 800 and the registered image 810 may be similar to those in the foregoing example embodiments described above. Pieces of frequency domain information 805 and 815 may be generated by applying a Fourier transform to the input image 800 and the registered image 810, and pieces of polar coordinate information 806 and 816 may be generated by applying a log-polar transform to the pieces of frequency domain information 805 and 815. Subsequently, pieces of phase information 807 and 817 may be generated by applying the Fourier transform to the pieces of polar coordinate information 806 and 816, and a phase correlation between the pieces of phase information 807 and 817 may be analyzed to calculate a first correction value. In the example embodiment illustrated in FIG. 17, the first correction value may be 37 degrees, as indicated in the graph provided at a lower left portion of FIG. 17.

A rotated registered image 820 may be generated by rotating the registered image 810 based on the first correction value, and input phase information 809 and registration phase information 821 may be generated by applying a Fourier transform to each of the input image 800 and the rotated registered image 820. The processor may compare the input phase information 809 with the registration phase information 821 in order to calculate a second correction value to be used for performing a translation transform of the rotated registered image 820, and may generate a reference registered image 830 by moving the rotated registered image 820 according to the second correction value.

The reference registered image 830 may be matched with the input image 800, to form an overlap region 840. Similar to the registered image 810, the reference registered image 830 also includes only the feature points. In the example embodiment illustrated in FIG. 17, a feature point 801 of the input image 800 and a feature point 832 of the reference registered image 830 may coincide with each other in the overlap region 840. Thus, a matching score within the overlap region 840 may be calculated to be sufficiently high to indicate that the fingerprint is authentic, and authentication of the input image 800 may be successful.

Next, referring to FIG. 18, an input image 900 and an original registered image 910 may have unique regions 901 and 911 which have respective feature points. In addition, due to foreign substances present on a fingerprint sensor, a user fingerprint skin, or the like, error regions 902 and 912 in which a fingerprint is not properly imaged may be present. Hereinafter, for convenience of explanation, it is assumed that the input image 900 is a legitimate user's fingerprint.

A process of matching the original registered image 910 may be similar to that in the foregoing example embodiment described with reference to FIG. 17. Pieces of frequency domain information 903 and 913 may be generated by applying a Fourier transform to the input image 900 and the registered image 910, and pieces of polar coordinate information 904 and 914 may be generated by applying a log-polar transform to the pieces of frequency domain information 903 and 913. Subsequently, pieces of phase information 905 and 915 may be generated by applying a Fourier transform to pieces of polar coordinate information 904 and 914, and a phase correlation between the pieces of phase information 905 and 915 may be analyzed to calculate a first correction value to be used for performing rotation transform. In the example embodiment illustrated in FIG. 18, the first correction value may be 37 degrees, as indicated in the graph provided at a lower left portion of FIG. 18.

A rotated registered image 920 may be generated by rotating the original registered image 910 based on the first correction value, and input phase information 906 and registration phase information 926 may be generated by applying a Fourier transform to each of the input image 900 and the rotated registered image 920. The processor may compare the input phase information 906 with the registration phase information 926 in order to calculate a second correction value to be used for performing a translation transform of the rotated registered image 920, and may generate a reference registered image 930 by moving the rotated registered image 920 according to the second correction value.

At least portions of the reference registered image 930 and the input image 900 may overlap each other to form an overlap region 940. In this case, since a plurality of error regions may be present in the overlap region 940, a matching score may be calculated to be relatively low due to the error regions, and thus, authentication of the input image 900 may fail. In order to prevent the problems as described above, in the example embodiment illustrated in FIG. 18, a weight may be assigned to a unique region 941 having a feature point in the overlap region 940. Thus, despite the presence of an error region in the overlap region 940, authentication of the input image 900 may be allowed due to the weight assigned to the unique region 941, and the performance of fingerprint recognition may be improved.

Figure 19:
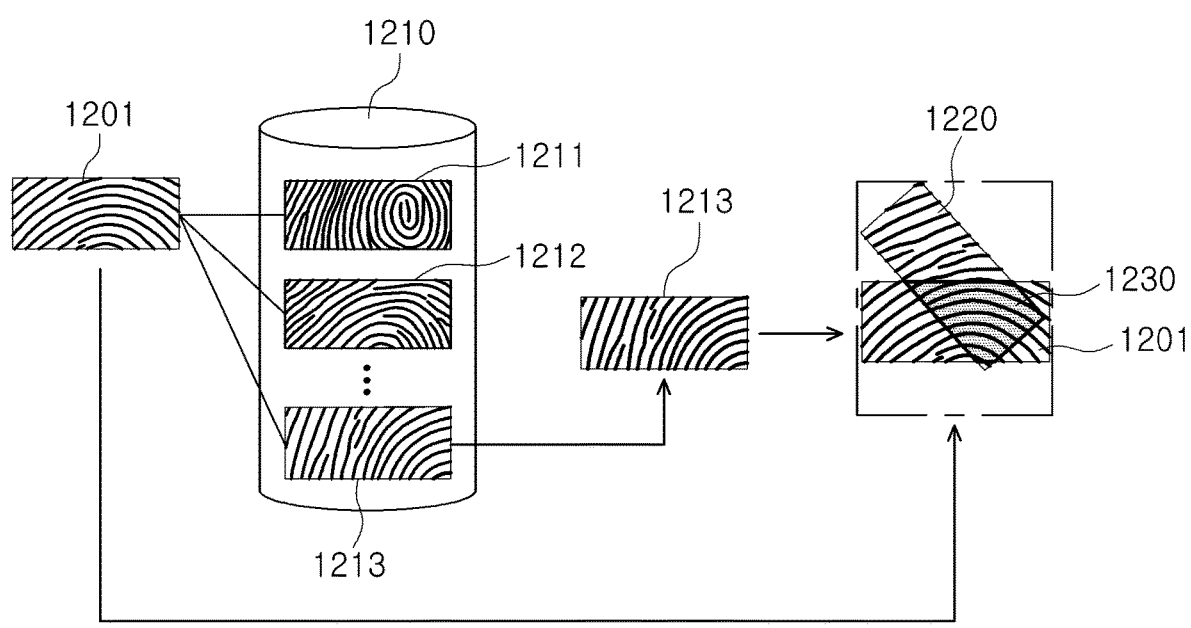
FIG. 19 is a diagram illustrating a registered image processing method, according to an example embodiment.

FIG. 19 is a diagram illustrating a registered image processing method, according to an example embodiment. In an example embodiment, a method for processing fingerprint information to be described with reference to FIG. 19 may be executed in a processor of an electronic device that includes a fingerprint sensor.

Referring to FIG. 19, an input image 1201 acquired from a user fingerprint may be compared with a plurality of registered images 1211, 1212, and 1213 stored in a memory 1210. In an example embodiment of FIG. 19, a third registered image 1213 and the input image 1201 may have a relatively high similarity, and a processor may rotate and/or move the third registered image 1213 in order to generate a reference registered image 1220. A reference registered image 1220 may be an image that is able to be matched with the input image 1201. The processor may determine whether the input image 1201 is authenticated, based on at least one of an area of an overlap region 1230 formed by overlapping the reference registered image 1220 and the input image 1201, and a matching score calculated with respect to the overlap region 1230.

For example, when the input image 1201 and the third registered image 1213 are compared with each other and authentication of the input image 1201 is successful, the processor may determine a similarity between the input image 1201 and the third registered image 1213 in order to determine whether a template formed by combining the input image 1201 and the third registered image 1213 is generated. The template may have at least one fingerprint image, and may function as reference data to be compared with the input image input via a fingerprint sensor in order to determine whether the user fingerprint is authenticated. For example, in an example embodiment, for example, when a specific condition is satisfied, the input image 1201 that has succeeded in the user authentication may be merged with at least one of the registered images 1211, 1212, and 1213 that have previously been stored, to thus be managed as a single template.

In the example embodiment illustrated in FIG. 19, for example, when the authentication of the user fingerprint is determined to be successful as a result of comparing the input image 1201 with the third registered image 1213, the processor may determine whether to merge the input image 1201 and the third registered image 1213 and to manage the merged images as a single template. In this case, reference similarity in merging the input image 1201 and the third registered image 1213 into a single template may have a higher value than that of similarity between the input image 1201 and the third registered image 1213, thereby becoming an authentication reference of the user fingerprint.

Figure 20:
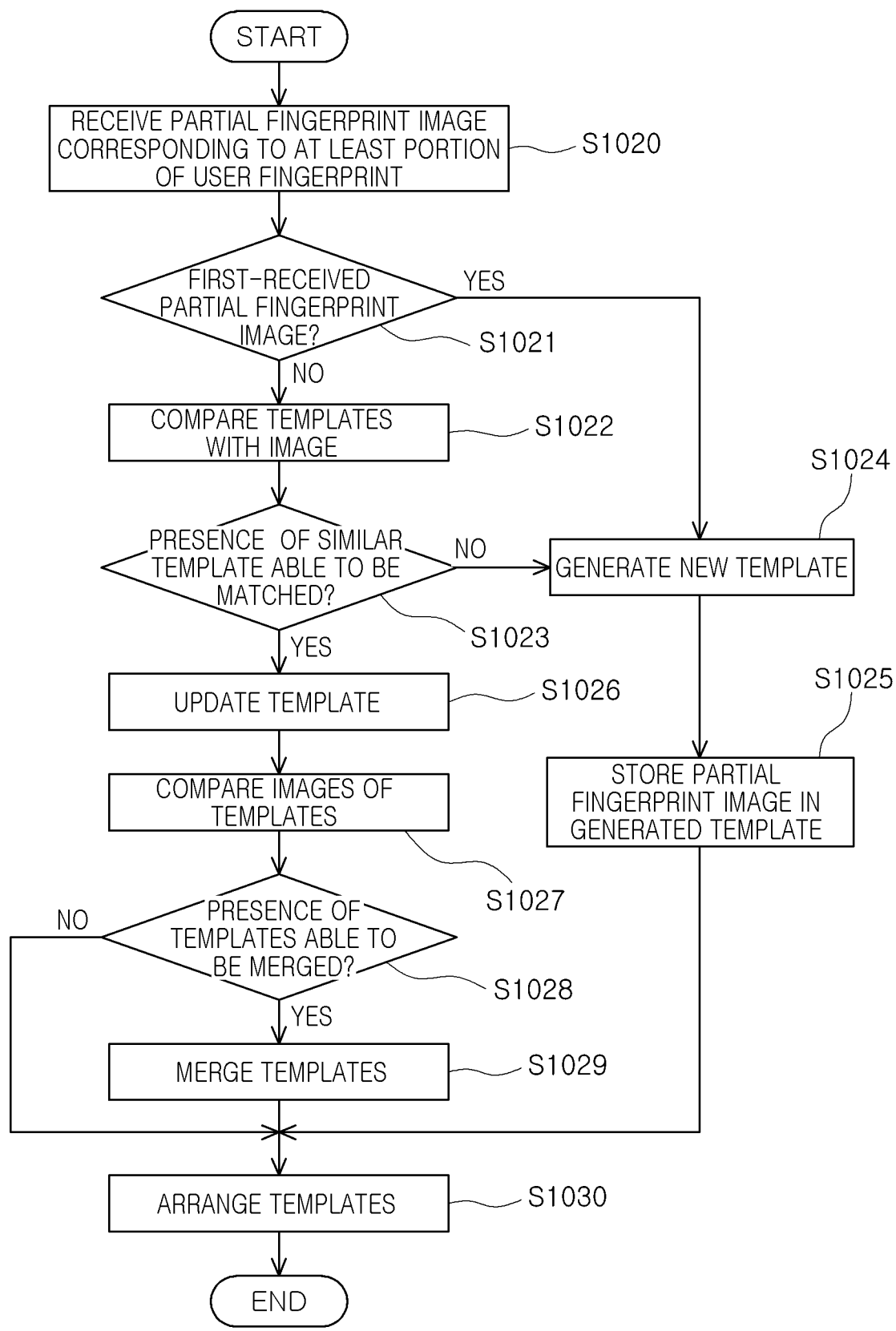
FIGS. 20 and 21 are flow charts illustrating a registered image processing method, according to an example embodiment.
Figure 21:
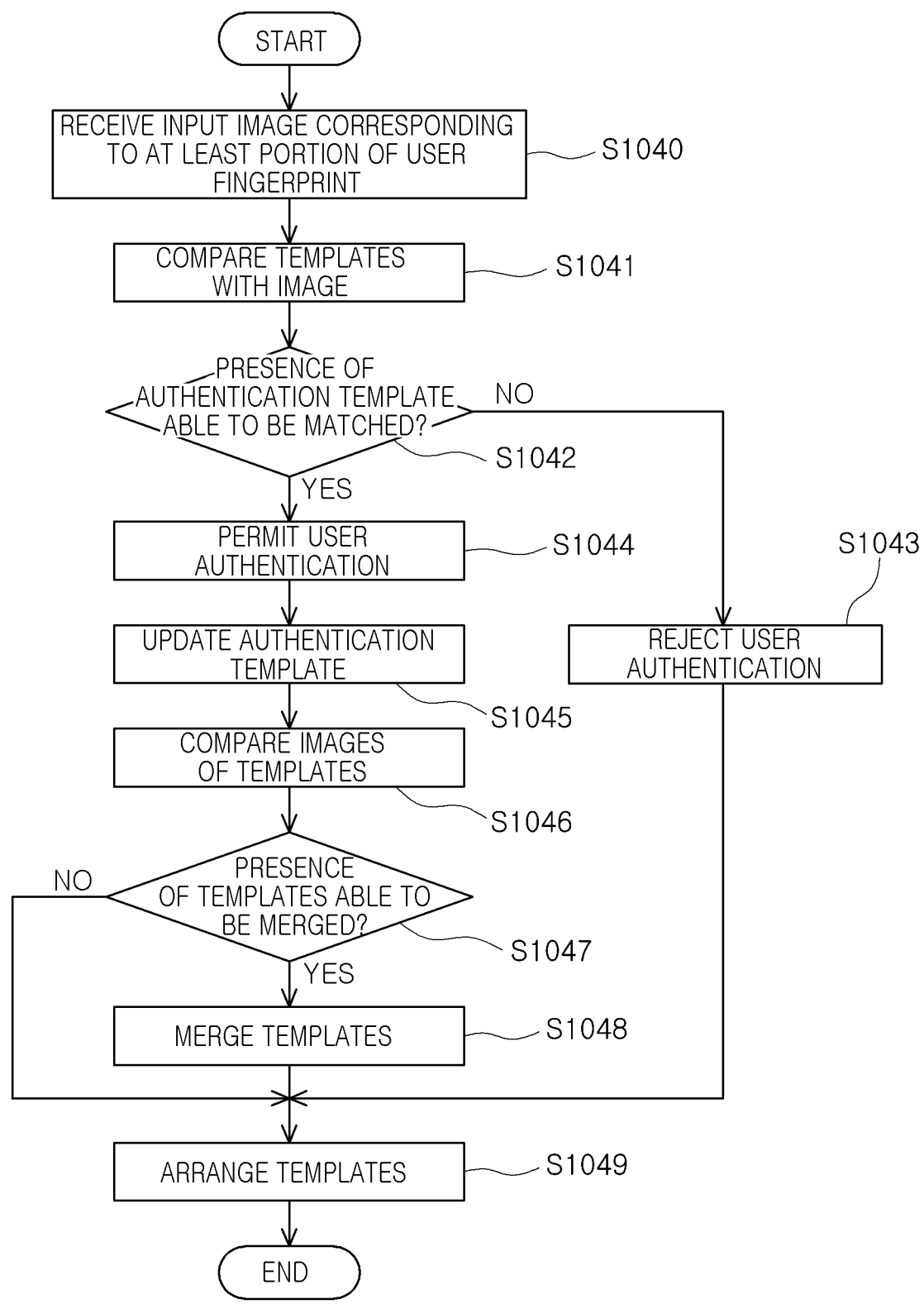

FIGS. 20 and 21 are flow charts illustrating a registered image processing method, according to an example embodiment. In an example embodiment, the registered image processing method to be described with reference to FIGS. 20 and 21 may be executed in a processor of an electronic device that includes a fingerprint sensor.

Referring to FIG. 20, the registered image processing method according to an example embodiment may begin with receiving a partial fingerprint image that corresponds to at least a portion of a user fingerprint, in a user fingerprint registration operation S1020. The partial fingerprint image may be acquired from a portion of the user fingerprint that is in contact with a fingerprint sensor, and may be provided to obtain user registration. A processor may determine whether the partial fingerprint image acquired in operation S1020 is a first input image, in operation S1021. For example, if there is no fingerprint image received before the partial fingerprint image acquired in operation S1020 and stored previously, the partial fingerprint image acquired in operation S1020 may be determined to be a first input image.

When it is determined in operation S1021 that the partial fingerprint image is the first input image, the processor may generate a new template in operation S1024, and may store the partial fingerprint image in the generated new template, in operation S1025. The partial fingerprint image stored in the template may be used as a registered image in a subsequent user authentication process.

As a result of the determination in operation S1021, for example, when it is determined that the partial fingerprint image is not the first input image, the processor may compare the partial fingerprint image with previously acquired and stored templates in operation S1022. The comparison in operation S1022 may be performed by comparing the partial fingerprint image with each of the registered images stored in the templates. In an example embodiment, the processor may compare the partial fingerprint image with each of the registered images included in the plurality of templates, respectively, in order to determine whether a similar template able to be matched with the partial fingerprint image is present in operation S1023.

As a result of the determination in operation S1023, if there is no similar template that is able to be matched with the partial fingerprint image, the processor may generate a new template in operation S1024, and may store the partial fingerprint image in the generated new template, in operation S1025. Conversely, as the result of the determination in operation S1023, when the similar template that is able to be matched with the partial fingerprint image is present, the processor may store the partial fingerprint image in the similar template to update the similar template in operation S1026. For example, in a case in which the similar template retrieved in operation S1023 has two existing registered images, the partial fingerprint image may be added in operation S1026, such that the similar template may include a total of three registered images.

When the template update is completed, the processor may compare each of the templates with other templates in operation S1027. For example, when first, second, and third templates are present, the first and second templates may be compared with each other, the second and third templates may be compared with each other, and the third and first templates may be compared with each other. The comparison in operation S1027 may include an image comparison process, and the processor may determine whether templates able to be merged with each other are present by determining a similarity of images provided by the templates, in operation S1028.

In a case in which a template that is able to be merged is present in operation S1028, the processor may combine the templates that are able to be merged with each other into a single template in operation S1029. For example, when the first and third templates have relatively high similarity and are thus merged into a fourth template, the processor may add an authentication success count of the first template and an authentication success count of the third template, and thus, may calculate an authentication success count of the fourth template. After completing the template merging, the processor may arrange and manage the respective templates according to the number of authentication successes, in operation S1030. If there is no template that is able to be merged in operation S1028, the processor may arrange and manage the templates according to the number of authentication successes without merging the templates in operation S1030.

For example, in the example embodiment described with reference to FIG. 20, when a partial fingerprint image for user registration is received, the partial fingerprint image may be compared with previously registered templates in order to determine whether a similar template with a relatively high similarity therewith is present. When the similar template that has a relatively high similarity with the partial fingerprint image is present, the partial fingerprint image may be merged with the similar template to be stored therein, while all the templates including the similar template may be compared with each other to determine a possibility of merging at least portions of the templates.

Next, referring to FIG. 21, a registered image processing method according to an example embodiment may begin with receiving an input image that corresponds to at least a portion of a user fingerprint, in operation S1040. The input image may be acquired from a portion of the user fingerprint that is in contact with a fingerprint sensor, and may be provided to obtain user authentication. A processor may compare the input image acquired in operation S1040 with templates that have registered images which have previously been stored, in operation S1041. Operation S1041 may be performed by image-matching and comparing the input image with a registered image of the template.

When the image matching and comparison between the input image and the template is completed, the processor may determine whether an authentication template that is able to be matched with the input image is present among the templates in operation S1042. If the authentication template is not present, the processor may determine that the input image has been generated from an illegitimate user, and may reject the user authentication in operation S1043. Conversely, when the authentication template is present, the processor may permit the user authentication in operation S1044, in order to cancel a lock mode of an electronic device, perform a payment process in a payment service, or the like.

After allowing the user authentication, the processor may update the authentication template by adding an input image to the authentication template in operation S1045. The processor may perform the update operation in operation S1045 by adding the input image to the authentication template only when the similarity between the input image and the authentication template is relatively high. The degree of similarity of the authentication template with the input image required to update the authentication template may have a stricter criterion than that of a degree of similarity of the authentication template with the input image required for user authentication permission.

When the template update is completed, the processor may perform image comparison between the templates in operation S1046. The processor may determine whether templates that are able to be merged are present in operation S1047, from a result of the image comparison in operation S1046 in which the templates that have similarity are present. For example, when templates that are able to be merged are present, the processor may merge the templates able to be merged into a single template in operation S1048, and may arrange and manage the templates in operation S1049. The templates may be sorted according to any of the number of authentication successes in user authentication, the number of registered images included in each of the templates, a total area of the registered images included in each of the templates, and the like. If there is no template that is able to be merged as a result of the determination in operation S1047, the processor may arrange and manage the templates while omitting the template merging process in operation S1049.

According to an example embodiment, for example, when a similarity between an input image acquired from a fingerprint sensor and an authentication template, one of a plurality of templates, is recognized, a processor may permit user authentication and may add the input image to the authentication template, thereby updating the authentication template. For example, the input image that has been determined as an image input by a legitimate user may be added to the template recognized as being similar to the input image, in order to continuously update the corresponding template. Thus, accuracy of the fingerprint authentication with respect to various input conditions and environments may be improved.

Figure 22A:
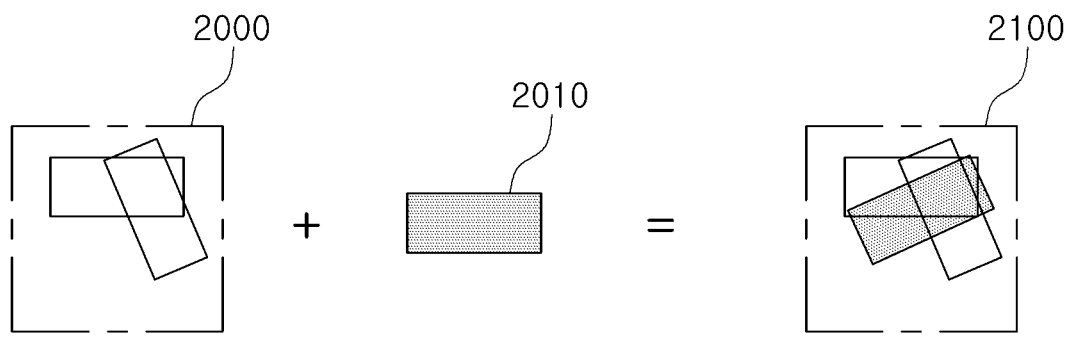
FIGS. 22A, 22B, and 22C are diagrams illustrating a registered image processing method, according to an example embodiment.
Figure 22B:
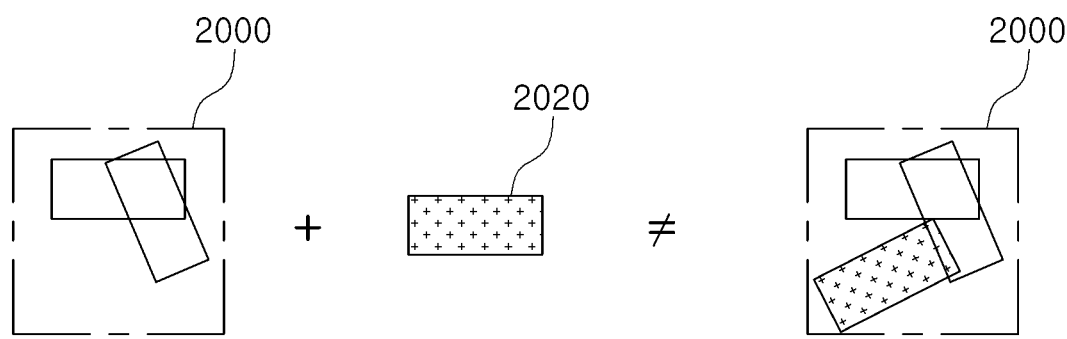
Figure 22C:
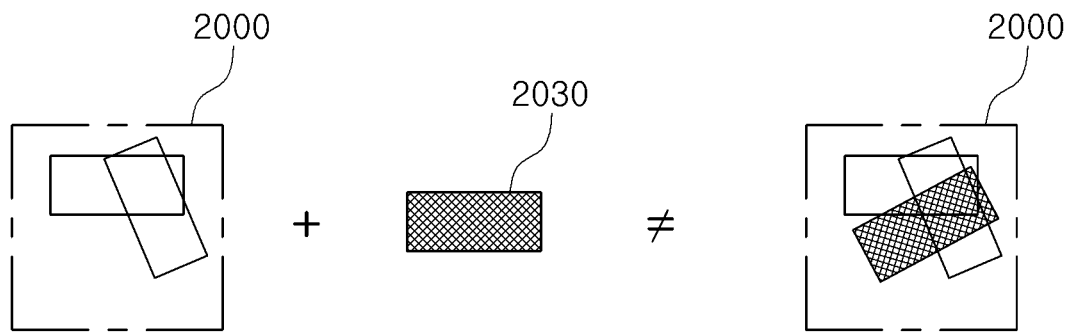

FIGS. 22A, 22B, and 22C are diagrams illustrating a registered image processing method, according to an example embodiment. In an example embodiment, the registered image processing method to be described with reference to FIGS. 22A, 22B, and 22C may be executed in a processor of an electronic device that includes a fingerprint sensor.

First, referring to an example embodiment illustrated in FIG. 22A, a template 2000 may include a plurality of registered images. A processor may compare the template 2000 with an input image 2010 in order to determine whether a user is authenticated. With reference to the example embodiment illustrated in FIG. 22A, the input image 2010 and registered images included in the template 2000 may form an overlap region, and user authentication based on the input image 2010 may be successful based on an area of the overlap region, and a matching score between the input image 2010 and the registered images. In addition, the input image 2010 may be merged into the template 2000, to thereby be updated with a new template 2100.

Next, referring to an example embodiment illustrated in FIG. 22B, an area of an overlap region formed between registered images included in the template 2000 and an input image 2020 may be relatively very small. Thus, user authentication based on the input image 2020 may be denied, and in this case, the template 2000 may not be updated by the input image 2020.

Referring to an example embodiment illustrated in FIG. 22C, an overlap region may be formed between registered images included in the template 2000 and an input image 2030, and thus, user authentication based on the input image 2030 may be successful. Compared with the case of FIG. 22A, however, the area of the overlap region formed in the example embodiment illustrated in FIG. 22C may be relatively small. In updating the template 2000 using the input image 2030, a stricter criterion may be employed than in the user authentication operation.

Thus, in the example embodiment illustrated in FIG. 22C, the user authentication based on the input image 2030 has succeeded, while the update of the template 2000 using the input image 2030 may be rejected. For example, by setting criteria applied to the user authentication and the template update differently from each other and applying a relatively strict criterion to the template update, an improper fingerprint image may be prevented from being added to the template, and thus, the template may be prevented from being contaminated. In addition, deterioration in reliability of the template may be prevented.

Figure 23:
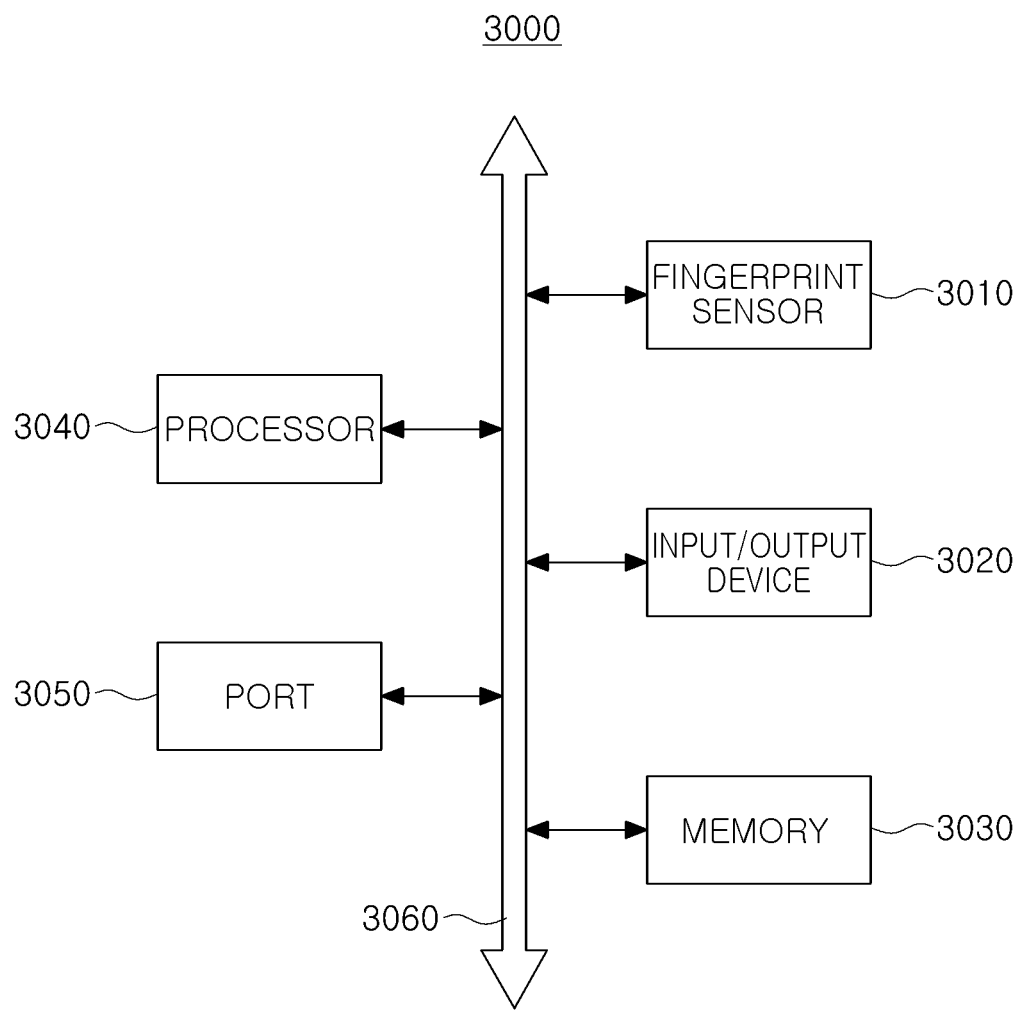
FIG. 23 is a block diagram of an electronic device, according to an example embodiment.

FIG. 23 is a block diagram of an electronic device, according to an example embodiment.

Referring to FIG. 23, a fingerprint sensor 3010 according to an example embodiment may be applied to a computer device 3000. The computer device 3000 according to the example embodiment illustrated in FIG. 23 may include an input/output device 3020, a memory 3030, a processor 3040, a port 3050, and the like, as well as the fingerprint sensor 3010. In addition, the computer device 3000 may further include a wired/wireless communications device, a power supply device, and the like. Among constituent elements illustrated in FIG. 23, the port 3050 may be a device provided to allow the computer device 3000 to communicate with a video card, a sound card, a memory card, a USB device, and the like. The computer device 3000 may be implemented as a comprehensive concept including any of a smartphone, a tablet PC, and a smart wearable device, and the like, as well as a general desktop computer and a laptop computer.

The processor 3040 may be configured to perform specific arithmetic operations, commands, tasks, and the like. The processor 3040 may be implemented as a central processing unit (CPU) or a microprocessor unit (MCU), and may be configured to communicate with the memory device 3030, the input/output device 3020, the fingerprint sensor 3010, and other devices connected to the port 3050, via a bus 3060.

The memory 3030 may include a storage medium that is configured to store data required for operations of the computer device 3000, multimedia data, or the like. The memory 3030 may include a volatile memory, such as a random access memory (RAM), or a non-volatile memory, such as a flash memory and the like. In addition, the memory 3030 may include at least one of a solid state drive (SSD), a hard disk drive (HDD), and an optical drive (ODD), as a storage device. The memory 3030 may store a registered image to be compared with an input image input through the fingerprint sensor 3010 therein. The input/output device 3020 may include an input device such as any of a keyboard, a mouse, a touchscreen, and the like for a user, and an output device such as any of a display, an audio output unit, and the like.

The fingerprint sensor 3010 may be connected to the processor 3040 by the bus 3060 or another communication means. The processor 3040 may perform user authentication by comparing an input image received via the fingerprint sensor 3010 with a registered image stored in the memory 3030. The user authentication process performed by the processor 3040 may be performed according to various example embodiments as described above with reference to FIGS. 1 to 22.

As set forth above, according to various example embodiments, by dividing each of an input image and a registered image into a plurality of regions and comparing the plurality of regions with each other to match the input image and the registered image, the accuracy of fingerprint recognition may be increased. Further, by updating a template having a registered image by using an input image that has been used successfully in performing an authentication, pieces of accurate fingerprint information may be accumulated to improve fingerprint recognition performance.

While example embodiments have been shown and described above, it will be apparent to those having ordinary skill in the art that modifications and variations could be made without departing from the scope of the present inventive concept as defined by the appended claims.

What is claimed is:

1. A method of authenticating a user based on fingerprint recognition, comprising:
   receiving, by a fingerprint sensor, a fingerprint of the user;
   dividing, by a processor, an input image that corresponds to at least a portion of the fingerprint of the user into a plurality of first regions;
   dividing, by the processor, a registered image that has previously been stored into a plurality of second regions;
   selecting, by the processor, a first matching region from among the plurality of first regions and selecting a second matching region from among the plurality of second regions, based on a comparison between the plurality of first regions and the plurality of second regions;
   matching, by the processor, the registered image with the input image by comparing the first matching region with the second matching region; and
   authenticating the user based on a result of the matching, wherein the authenticating comprises:
      determining, by the processor, a matching score that indicates a similarity between the registered image and the input image, by assigning a first predetermined weight to a first sub-region in an overlap region formed by the matching the registered image with the input image and by assigning a second predetermined weight to a second sub-region included in the overlap region and adjacent to the first sub-region;
      determining, by the processor, an area of the overlap region; and
      determining, by the processor, whether the fingerprint is authenticated, based on at least one from among the matching score and the area of the overlap region, and
   wherein the matching score is determined by assigning each of the first predetermined weight and the second predetermined weight when a normalized cross-correlation between the registered image and the input image is computed.

2. The method of claim 1, further comprising:
   determining, by the processor, a plurality of matching probabilities that correspond to similarities between each of the plurality of first regions and each of the plurality of second regions; and
   determining, by the processor, the first matching region and the second matching region based on a highest matching probability from among the plurality of matching probabilities.

3. The method of claim 2, wherein the determining the plurality of matching probabilities comprises determining the plurality of matching probabilities by determining phase correlations between each of the plurality of first regions and each of the plurality of second regions.

4. The method of claim 3, wherein a peak value of each of the phase correlations is detected to generate correction values for performing a rotation transform of the registered image.

5. The method of claim 1, wherein the matching the registered image with the input image comprises:

rotating the registered image, based on a first correction value generated by comparing the first matching region with the second matching region; and matching the registered image with the input image by moving the registered image that has been rotated based on a second correction value, wherein the second correction value is generated by comparing the input image with the registered image that has been rotated.

6. The method of claim 5, wherein the second correction value is generated by comparing the first matching region with the second matching region after the registered image has been rotated based on the first correction value.

7. The method of claim 1, wherein the determining the matching score comprises:

dividing the overlap region into a plurality of sub-regions;
searching minutiae in the overlap region; and
determining the normalized cross-correlation between the registered image and the input image in the overlap region by assigning the first predetermined weight and the second predetermined weight.

8. A method of authenticating a user based on fingerprint recognition, comprising:

receiving, by a fingerprint sensor, a fingerprint of the user;
dividing, by a processor, each of an input image that corresponds to at least a portion of the fingerprint of the user and a registered image that has previously been stored into a plurality of sub-regions;
finding, by the processor, from among the plurality of sub-regions of each of the registered image and the input image, a first sub-region that is included in an overlap region in which the registered image overlaps the input image and a second sub-region that is included in the overlap region and is adjacent to the first sub-region, each of the first sub-region and the second sub-region including minutiae; and
determining, by the processor, whether the user is authenticated, by assigning a first predetermined weight to the first sub-region and a second predetermined weight to the second sub-region,
wherein the determining whether the fingerprint is authenticated comprises:
  determining a matching score that indicates a similarity between the registered image and the input image in the overlap region by assigning the first predetermined weight to the first sub-region and the second predetermined weight to the second sub-region;
  determining an area of the overlap region, and
  determining whether the fingerprint is authenticated based on at least one from among the matching score and the area of the overlap region, and
wherein the matching score is determined by assigning each of the first predetermined weight and the second predetermined weight when a normalized cross-correlation between the registered image and the input image is computed.

9. The method of claim 8, wherein the first predetermined weight assigned to the first sub-region is greater than the second predetermined weight assigned to the second sub-region.

10. The method of claim 8, wherein the registered image comprises information that relates to minutiae included in an original fingerprint image that has previously been input.

11. The method of claim 8, further comprising:

dividing, by the processor, the input image into a plurality of first regions and dividing the registered image into a plurality of second regions; and
matching, by the processor, the input image with the registered image to form the overlap region, by comparing the plurality of first regions with the plurality of second regions.

12. A method of authenticating a user based on fingerprint recognition, comprising:

receiving, by a fingerprint sensor, a fingerprint of the user;
receiving, by a processor, an input image that corresponds to at least a portion of the fingerprint of the user;
determining, by the processor, from among a plurality of templates, whether an authentication template to be matched with the input image is present by comparing each respective one from among the plurality of templates with the input image;
when the authentication template is determined as being present, facilitating, by the processor, an authentication of the fingerprint, and updating, by the processor, the authentication template by using the input image;
after the authentication template is updated by using the input image, determining, by the processor, whether at least one additional template, from among the plurality of templates, matches with the authentication template that has been updated; and
when the at least one additional template is determined as being present, merging, by the processor, the authentication template that has been updated with the at least one additional template,
wherein a first number of authentication successes of a new template generated by merging the authentication template that has been updated with the at least one additional template is set to be equal to a sum of a second number of authentication successes of the authentication template that has been updated and a third number of authentication successes of the at least one additional template.

13. The method of claim 12, wherein when the authentication template is determined as being present, the fingerprint is authenticated, and a number of authentication successes of the authentication template is updated.

14. The method of claim 12, wherein the updating comprises updating the authentication template based on at least one from among an area of an overlap region formed by overlapping a registered image included in the authentication template with the input image, and a normalized cross-correlation of the registered image and the input image calculated in the overlap region.

15. The method of claim 14, wherein the authentication template comprises a plurality of registered images and the overlap region corresponds to a region in which all of the plurality of registered images and the input image overlap each other.

* * * * *